(12) United States Patent
Rahnama et al.

(10) Patent No.: US 12,026,905 B2
(45) Date of Patent: Jul. 2, 2024

(54) STEREO IMAGE PROCESSING

(71) Applicant: Five AI Limited, Bristol (GB)

(72) Inventors: Oscar Rahnama, Oxford (GB); Tommaso Cavallari, Oxford (GB)

(73) Assignee: Five AI Limited, Cambridge (GB)

( * ) Notice: Subject to any disclaimer, the term of this patent is extended or adjusted under 35 U.S.C. 154(b) by 567 days.

(21) Appl. No.: 17/288,281

(22) PCT Filed: Oct. 24, 2019

(86) PCT No.: PCT/EP2019/079103
§ 371 (c)(1),
(2) Date: Apr. 23, 2021

(87) PCT Pub. No.: WO2020/084091
PCT Pub. Date: Apr. 30, 2020

(65) Prior Publication Data
US 2022/0058820 A1 Feb. 24, 2022

(30) Foreign Application Priority Data

Oct. 25, 2018 (GB) ...................................... 1817378
Oct. 25, 2018 (GB) ...................................... 1817390
Oct. 26, 2018 (GB) ...................................... 1817472

(51) Int. Cl.
*G06T 7/593* (2017.01)

(52) U.S. Cl.
CPC .... *G06T 7/593* (2017.01); *G06T 2207/10012* (2013.01); *G06T 2207/10028* (2013.01); *G06T 2207/20221* (2013.01)

(58) Field of Classification Search
CPC ........... G06T 7/593; G06T 2207/10012; G06T 2207/10028; G06T 2207/20221
See application file for complete search history.

(56) References Cited

U.S. PATENT DOCUMENTS

2011/0050853 A1* 3/2011 Zhang ................. H04N 13/261
348/44
2014/0192158 A1 7/2014 Whyte et al.
2018/0262744 A1 9/2018 Tadi et al.

OTHER PUBLICATIONS

[No Author Listed], Kodak Lossless True Color Image Suite. Jun. 27, 2019. 3 pages. https://web.archive.org/web/20190627140515/http://r0k.us/graphics/kodak/ [Last accessed Mar. 16, 2022].

(Continued)

*Primary Examiner* — Sam Bhattacharya
(74) *Attorney, Agent, or Firm* — Andrew J. Tibbetts; Samuel S. Stone; Greenberg Traurig, LLP

(57) ABSTRACT

In one aspect, a method of extracting depth information from a stereoscopic pair of images comprises: in a first depth extraction phase, determining a set of support points in 3D space for at least a first image of the stereoscopic image pair; using the set of support points to determine a 3D surface prior; and in a second depth extraction phase, computing, for the first image, a second-stage disparity map, by optimizing a second cost function defined so as to penalize deviation in the second-stage disparity map from the 3D surface prior. Disparity smoothness may be encouraged in at least one of the first and second depth extraction phases using a cost function that penalizes deviations in disparity between nearby pixels.

19 Claims, 7 Drawing Sheets

(56) References Cited

OTHER PUBLICATIONS

Arce et al., Detail-preserving ranked-order based filters for image processing. IEEE Transactions on Acoustics, Speech, and Signal Processing. Jan. 1989;37(1):83-98.

Banks et al., Quantitative evaluation of matching methods and validity measures for stereo vision. The International Journal of Robotics Research. Jul. 2001;20(7):512-32.

Banz et al., Real-time semi-global matching disparity estimation on the GPU. IEEE International Conference on Computer Vision Workshops (ICCV Workshops) Nov. 2011. 8 pages.

Banz et al., Real-time stereo vision system using semi-global matching disparity estimation: Architecture and FPGA-implementation. 2010 International Conference on Embedded Computer Systems: Architectures, Modeling and Simulation Jul. 19, 2010:93-101.

Besse et al., Pmbp: Patchmatch belief propagation for correspondence field estimation. International Journal of Computer Vision. Oct. 1, 2014;110(1):1-11.

Casper et al., Hardware acceleration of database operations. Proceedings of the 2014 ACM/SIGDA international symposium on Field-programmable gate arrays Feb. 26, 2014:151-60.

Cavallari et al., On-the-fly adaptation of regression forests for online camera relocalisation. Proceedings of the IEEE conference on computer vision and pattern recognition 2017:4457-66.

Cavallari et al., Real-Time RGB-D Camera Pose Estimation in Novel Scenes using a Relocalisation Cascade. arXiv preprint arXiv:1810.12163. Jul. 2, 2018. 24 pages.

Chen et al., Energy and memory efficient mapping of bitonic sorting on FPGA. Proceedings of the 2015 ACM/SIGDA International Symposium on Field-Programmable Gate Arrays Feb. 22, 2015:240-9.

Chen et al., Fast MRF optimization with application to depth reconstruction. Proceedings of the IEEE conference on computer vision and pattern recognition. 2014:1-8.

Cocorullo et al., An efficient hardware-oriented stereo matching algorithm. Microprocessors and Microsystems. Oct. 1, 2016;46:21-33.

Dehnavi et al., FPGA based real-time on-road stereo vision system. Journal of Systems Architecture. Nov. 1, 2017;81:32-43.

De-Maeztu et al., Linear stereo matching. 2011 International Conference on Computer Vision. Nov. 6, 2011:8 pages.

Drory et al., Semi-global matching: a principled derivation in terms of message passing. German Conference on Pattern Recognition. Sep. 2, 2014:12 pages.

Fahmy et al., Novel FPGA-based implementation of median and weighted median filters for image processing. International Conference on Field Programmable Logic and Applications, 2005. Aug. 24, 2005:142-7.

Gehrig et al., A real-time low-power stereo vision engine using semi-global matching. International Conference on Computer Vision Systems. Springer, Berlin, Heidelberg. Oct. 13, 2009:134-43.

Gehrig et al., Real-time semi-global matching on the CPU. 2010 IEEE Computer Society Conference on Computer Vision and Pattern Recognition-Workshops Jun. 13, 2010:85-92.

Geiger et al., Are we ready for autonomous driving? The KITTI Vision Benchmark Suite. 2012 IEEE Conference on Computer Vision and Pattern Recognition. Jun. 16, 2012:1-8.

Geiger et al., Efficient large-scale stereo matching. Asian conference on computer vision. Springer, Berlin, Heidelberg. Nov. 8, 2010;1-14.

Georgoulas et al., A real-time fuzzy hardware structure for disparity map computation. Journal of Real-Time Image Processing. Dec. 2011;6(4):257-73.

Godard et al., Unsupervised monocular depth estimation with left-right consistency. Proceedings of the IEEE Conference on Computer Vision and Pattern Recognition. 2017:270-279.

Golodetz et al., Collaborative large-scale dense 3d reconstruction with online inter-agent pose optimisation. IEEE transactions on visualization and computer graphics. Oct. 15, 2018;24(11):2895-905.

Hernandez-Juarez et al., Embedded real-time stereo estimation via semi-global matching on the GPU. Procedia Computer Science. Jan. 1, 2016;80:143-53.

Hicks et al., A depth-based head-mounted visual display to aid navigation in partially sighted individuals. PloS one. Jul. 3, 2013;8(7):e67695. 8 pages.

Hirschmüller et al., Evaluation of stereo matching costs on images with radiometric differences. IEEE transactions on pattern analysis and machine intelligence. Sep. 5, 2008;31(9):17 pages.

Hirschmüller, Semi-global matching-motivation, developments and applications. Photogrammetric Week 11. 2011:173-84.

Hirschmüller, Stereo processing by semiglobal matching and mutual information. IEEE Transactions on pattern analysis and machine intelligence. Dec. 18, 2007;30(2):14 pages.

Honegger et al., Real-time and low latency embedded computer vision hardware based on a combination of FPGA and mobile CPU. 2014 IEEE/RSJ International Conference on Intelligent Robots and Systems Sep. 14, 2014. 6 pages.

Hosni et al., Secrets of adaptive support weight techniques for local stereo matching. Computer Vision and Image Understanding. Jun. 1, 2013;117(6):620-32.

Huan-Sheng et al., A new adaptive multistage median filter. Sixth International Conference on Parallel and Distributed Computing Applications and Technologies (PDCAT'05) Dec. 5, 2005. 3 pages.

Komodakis et al., Performance vs computational efficiency for optimizing single and dynamic MRFs: Setting the state of the art with primal-dual strategies. Computer Vision and Image Understanding. Oct. 1, 2008;112(1). 8 pages.

Kuzmin et al., End-to-end learning of cost-vol. aggregation for real-time dense stereo. 2017 IEEE 27th International Workshop on Machine Learning for Signal Processing (MLSP) Sep. 25, 2017. 6 pages.

Li et al., SoC and FPGA oriented high-quality stereo vision system. 2016 26th International Conference on Field Programmable Logic and Applications (FPL). 2016. 4 pages.

Liu et al., Learning depth from single monocular images using deep convolutional neural fields. IEEE transactions on pattern analysis and machine intelligence. Dec. 3, 2015;38(10):2024-39.

Lu et al., Denoising of salt-and-pepper noise corrupted image using modified directional-weighted-median filter. Pattern Recognition Letters. Jul. 15, 2012;33(10):1287-95.

Ma et al., Constant time weighted median filtering for stereo matching and beyond. Proceedings of the IEEE International Conference on Computer Vision 2013:49-56.

Marcus et al., A fast median filter approximation. Tech. Rep. LA-UR-13-25331, Los Alamos National Laboratory; Jul. 16, 2013. 12 pages.

Mashimo et al., Cost-effective and high-throughput merge network: Architecture for the fastest FPGA sorting accelerator. ACM SIGARCH Computer Architecture News. Jan. 11, 2017;44(4):8-13.

Mashimo et al., High-performance hardware merge sorter. 2017 IEEE 25th Annual International Symposium on Field-Programmable Custom Computing Machines (FCCM) Apr. 30, 2017. 9 pages.

Mattoccia et al., A passive RGBD sensor for accurate and real-time depth sensing self-contained into an FPGA. Proceedings of the 9th International Conference on Distributed Smart Cameras Sep. 8, 2015:146-51.

Menze et al., Joint 3d estimation of vehicles and scene flow. ISPRS annals of the photogrammetry, remote sensing and spatial information sciences. 2015;2:427-34.

Menze et al., Object scene flow. ISPRS Journal of Photogrammetry and Remote Sensing. Jun. 1, 2018;140:60-76.

Nieminen et al., A new class of detail-preserving filters for image processing. IEEE Transactions on Pattern Analysis and Machine Intelligence. Jan. 1987(1):74-90.

Oleynikova et al., Reactive avoidance using embedded stereo vision for mav flight. 2015 IEEE International Conference on Robotics and Automation (ICRA). May 26, 2015. 7 pages.

(56) References Cited

OTHER PUBLICATIONS

Pérez-Patricio et al., An FPGA stereo matching unit based on fuzzy logic. Microprocessors and Microsystems. May 1, 2016;42:87-99.

Pérez-Patricio et al., FPGA implementation of an efficient similarity-based adaptive window algorithm for real-time stereo matching. Journal of Real-Time Image Processing. 2015. 17 pages.

Perri et al., Design of real-time fpga-based embedded system for stereo vision. 2018 IEEE International Symposium on Circuits and Systems (ISCAS) May 27, 2018:1-5.

Perri et al., Stereo vision architecture for heterogeneous systems-on-chip. Journal of Real-Time Image Processing. Apr. 2020;17(2):393-415.

Prisacariu et al., Infinitam v3: A framework for large-scale 3d reconstruction with loop closure. arXiv preprint arXiv:1708.00783. Aug. 2, 2017. 19 pages.

Rahnama et al., R3SGM: Real-time Raster-Respecting Semi-Global Matching for Power-Constrained Systems. arXiv preprint arXiv:1810.12988. Oct. 30, 2018. 9 pages.

Rahnama et al., Real-Time Dense Stereo Matching With ELAS on FPGA Accelerated Embedded Devices. arXiv preprint arXiv:1802.07210. Feb. 20, 2018. 8 pages.

Rahnama et al., Real-time depth processing for embedded platforms. Real-Time Image and Video Processing. May 1, 2017(10223). 12 pages.

Rahnama et al., Real-Time Highly Accurate Dense Depth on a Power Budget using an FPGA-CPU Hybrid SoC. arXiv preprint arXiv:1907.07745. Jul. 17, 2019. 6 pages.

Rhemann et al., Fast cost-volume filtering for visual correspondence and beyond. CVPR 2011 Jun. 20, 2011:3017-24.

Richards, VLSI median filters. IEEE Transactions on Acoustics, Speech, and Signal Processing. Jan. 1990;38(1):145-53.

Scharstein et al., A taxonomy and evaluation of dense two-frame stereo correspondence algorithms. International journal of computer vision (IJCV). Apr. 2002;47(1):7-42.

Scharstein et al., High-accuracy stereo depth maps using structured light. 2003 IEEE Computer Society Conference on Computer Vision and Pattern Recognition. Jun. 18, 2003. 8 pages.

Scharstein et al., High-resolution stereo datasets with subpixel-accurate ground truth. German conference on pattern recognition (GCPR). Sep. 2, 2014. 12 pages.

Schmid et al., Stereo vision and IMU based real-time ego-motion and depth image computation on a handheld device. International Conference on Robotics and Automation (ICRA). May 6, 2013. 8 pages.

Shan et al., Hardware acceleration for an accurate stereo vision system using mini-census adaptive support region. ACM Transactions on Embedded Computing Systems (TECS). Apr. 1, 2014. 24 pages.

Sherwin et al., Median filtering with very large windows: SKA algorithms for FPGAs. 2018 28th International Conference on Field Programmable Logic and Applications (FPL) Aug. 2018. 6 pages.

Shotton et al., Scene coordinate regression forests for camera relocalization in RGB-D images. Proceedings of the IEEE Conference on Computer Vision and Pattern Recognition 2013:2930-37.

Sklyarov et al., High-performance implementation of regular and easily scalable sorting networks on an FPGA. Microprocessors and Microsystems. Jul. 1, 2014;38(5):470-84.

Song et al., Parallel hardware merge sorter. 2016 IEEE 24th Annual International Symposium on Field-Programmable Custom Computing Machines (FCCM) May 2016. 8 pages.

Srivastava et al., A hybrid design for high performance large-scale sorting on FPGA. 2015 International Conference on ReConFigurable Computing and FPGAs (ReConFig) Dec. 7, 2015 :1-6.

Sun et al., Stereo matching using belief propagation. IEEE Transactions on pattern analysis and machine intelligence. Jun. 20, 2003;25(7):787-800.

Tateno et al., Cnn-slam: Real-time dense monocular slam with learned depth prediction. Proceedings of the IEEE Conference on Computer Vision and Pattern Recognition (CVPR). 2017:6243-6252.

Tippetts et al., Review of stereo vision algorithms and their suitability for resource-limited systems. Journal of Real-Time Image Processing. Jan. 2016;11(1):5-25.

Ttofis et al., High-quality real-time hardware stereo matching based on guided image filtering. 2014 Design, Automation & Test in Europe Conference & Exhibition (DATE) Mar. 24, 2014:1-6.

Wang et al., Real-time high-quality stereo vision system in Fpga. IEEE Transactions on Circuits and Systems for Video Technology. Jan. 30, 2015;25(10):1696-708.

Wang, Generalized multistage median filters. IEEE transactions on image processing. Oct. 1992;1(4):543-5.

Werner et al., Hardware implementation of a full HD real-time disparity estimation algorithm. IEEE transactions on consumer electronics. Feb. 2014;60(1):66-73.

Whelan et al., ElasticFusion: Real-time dense SLAM and light source estimation. The International Journal of Robotics Research. Dec. 2016;35(14). 23 pages.

Zabih et al., Non-parametric local transforms for computing visual correspondence. European conference on computer vision (ECCV). May 2, 1994:151-158.

Zha et al., A real-time global stereo-matching on FPGA. Microprocessors and Microsystems. Nov. 1, 2016;47:419-28.

Zhang et al., 100+ times faster weighted median filter (WMF). Proceedings of the IEEE Conference on Computer Vision and Pattern Recognition 2014. 8 pages.

Zhang et al., Microsoft kinect sensor and its effect. IEEE multimedia. Apr. 27, 2012;19(2):4-10.

Zhang et al., Real-time high-definition stereo matching on FPGA. Proceedings of the 19th ACM/SIGDA international symposium on Field programmable gate arrays Feb. 27, 2011:55-64.

PCT/EP2019/079103, Mar. 27, 2020, International Search Report and Written Opinion.

PCT/EP2019/079103, Feb. 6, 2020, Invitation to Pay Additional Fees.

International Search Report and Written Opinion for International Application No. PCT/EP2019/079103, mailed Mar. 27, 2020.

Invitation to Pay Additional Fees for International Application No. PCT/EP2019/079103, mailed Feb. 6, 2020.

Ghandi et al., High-resolution depth maps based on TOF-stereo fusion. 2012 IEEE International Conference on Robotics and Automation. May 14, 2012:4742-4749.

\* cited by examiner

STEREO IMAGE PROCESSING

RELATED APPLICATIONS

This application is a national stage filing under 35 U.S.C. § 371 of International Patent Application Serial No. PCT/EP2019/079103, filed Oct. 24, 2019, which claims priority to United Kingdom patent application number GB 1817472.2, filed Oct. 26, 2018; to United Kingdom patent application number GB 1817378.1, filed Oct. 25, 2018; and to United Kingdom patent application number GB 1817390.6, filed Oct. 25, 2018. Each of the foregoing applications is incorporated by reference herein in its entirety.

TECHNICAL FIELD

This disclosure relates to stereo image processing. That is to say, the extraction of depth information from stereoscopic image pairs.

BACKGROUND

Obtaining information about the 3D structure of a scene is important for many computer vision and robotics applications, e.g. 3D scene reconstruction, camera re-localisation, navigation and obstacle avoidance. Often, this information will be obtained in the form of a depth image, and various options for acquiring such images exist. Active approaches, e.g. structured light, produce accurate results, but cannot be used under strong sunlight, limiting them to indoor use. By contrast, LiDAR is able to produce highly accurate depth both indoors and outdoors, but the resulting point clouds are sparse, and most LiDAR units are heavy, costly and power-hungry, limiting their use for mobile and low-power agents.

Passive depth sensing technologies are an appealing alternative, relying only on one or more image sensors, and shifting the complexity from the acquisition hardware to algorithm and computation. Some of the many advantages of passive sensors are their lower costs, lower weight, lack of active components, deployability in a wider range of operating environments, and ability to work at longer range. Among passive approaches to depth estimation, binocular Stereo relies on a pair of synchronised cameras to acquire images of the same scene from two different points of view. Given the two synchronised frames (usually referred to as left and right), a dense and reliable depth map can be computed by finding correspondences between the pixels in the two images.

A stereoscopic (stereo) image pair refers to a pair of images that have been captured substantially simultaneously by a stereoscopically arranged pair of image capture units. Typically, the image capture units have a horizontal offset from each other but are vertically aligned. By convention, the two images are referred to as left and right images, respectively, to reflect this typical arrangement. Depth information is captured as disparities between the two images, wherein the closer an object is to the image capture units, the greater the disparity in the respective locations of the pixels belonging to the object in the two images.

The basic principle of depth extraction is that, by identifying corresponding pairs of pixels in the left and right images respectively, the depth of those pixels can be determined from a relative disparity they exhibit. In order to do this, one of the images of a stereoscopic image pair is taken as a target image and the other as a reference image. For each pixel in the target image, a search is performed for a matching pixel in the reference image. Matching can be evaluated based on relative intensities, local features, etc. This search can be simplified by an inherent geometric constraint, namely that, given a pixel in the target image, the corresponding pixel in the reference image will lie on a known "epipolar line", at a location on that line that depends on the depth (distance from the image capture units) of the corresponding real-world structure.

For an ideal stereoscopic system with vertically aligned image capture units, the epipolar lines are all horizontal, such that, given any pixel in the target image with a corresponding pixel in the reference image, the corresponding pixel will be located in the reference image on a horizontal line (x-axis) at the same height (y) as the pixel in the target image. That is, for perfectly aligned image capture units, corresponding pixels in the left and right images will always have the same vertical coordinate (y) in both images, and the only variation will be in their respective horizontal (x) coordinates. This may not be the case in practice. However, pre-processing such as image rectification may be applied to the images to account for any misalignment and thereby ensure that corresponding pixels are always vertically aligned in the images. Hence, by applying image rectification/pre-processing as necessary, the search for a matching pixel in the reference image can conveniently be restricted to a search in the reference image along (typically) the horizontal axis at a height defined by the current pixel in the target image. Hence, for rectified image pairs, the disparity exhibited by a pair of pixels in the target and reference images respectively can be expressed as a (typically) horizontal offset between the locations of those pixels in their respective images.

This search can be implemented effectively using a function optimization, wherein an energy function E (D) is defined with respect to a disparity map D.

The disparity map D assigns a disparity to each pixel of the target image, and thus associates pixels in the target image with corresponding pixels in the reference image. (Note: disparities are not necessarily determined across full images captured by the image capture units; for example, pixels near the edge of a full image may be excluded, as the corresponding pixels may not actually exist in the reference image. It will thus be appreciated that the term "target image", as used herein, may in some circumstances refer to a region of a larger image for which corresponding pixels exist in the reference image.)

The optimization process is applied with the objective of determining a disparity map D that optimizes the energy function E (D). The optimization process does not necessarily guarantee that a truly optimal disparity map will be found that exactly optimizes the desired energy function. For example, the process may be applied using an approximation of the desired energy function in order to make the process tractable.

In order to perform the optimization process, a cost function such as a per-pixel cost function L (p, d) may be defined that quantifies a cost of assigning pixel p (in the target image) a disparity d. Assigning disparity d to pixel p associates pixel p in the target image with a pixel q in the reference image where q is defined by d—typically q=p—di where $I=[1,0]^T$, i.e. q is horizontally offset from p by d. The cost function L(p, d) may be defined such that the energy function E (D) is at least approximately optimized when the cost function is optimized over its input range (e.g. over all pixels under consideration).

SUMMARY

State-of-the-art algorithms for stereo depth extraction usually rely on costly global image optimisations or on massive convolutional neural networks that involve significant computational costs, making them hard to deploy on resource-limited systems such as embedded devices.

Various aspects of the present disclosure relate to methods of extracting depth information from a stereoscopic pair of images, generally in the form of a disparity map. A core issue addressed herein is that of achieving high accuracy in a resource-efficient manner (i.e. with reduced computational resources). This, in turn, facilitates possible applications on resource-limited platforms (for example).

A number of aspects enforce "smoothness" in the disparity map by penalizing deviation in the respective disparities assigned to nearby pixels in the reference image, i.e. penalizing excessive "jumps" in disparity within the depth map.

In such aspects, a stereo image processing component processes a pair of stereoscopic images in order to assign, to each point (pixel) in a set of pixels of a first of the images, a disparity which optimizes a cost function, wherein the cost function is defined so as to:

(i) encourage matching between the pixel of the first image and a pixel of the second image associated therewith by the assigned disparity, whilst (ii) penalizing deviation in the disparity assigned to the pixel of the first image from the disparity assigned to at least one nearby pixel of the first image (this can be equivalently stated as encouraging "smoothness" in the disparity map).

In so doing, a disparity map is computed for the first image which comprises the disparities assigned to the set of pixels thereof.

A first aspect of the present invention pertains to two-stage depth extraction, with smoothness encouraged in at least one of the depth extraction stages.

The first aspect provides a method of extracting depth information from a stereoscopic pair of images, the stereoscopic image pair formed of a first image and a second image, the method implemented in an image processing system and comprising: in a first depth extraction phase, determining a set of support points in 3D space for at least the first image of the stereoscopic image pair; using the set of support points to determine a 3D surface prior; and in a second depth extraction phase, computing, for the first image, a second-stage disparity map, by optimizing a second cost function defined so as to penalize deviation in the second-stage disparity map from the 3D surface prior; wherein disparity smoothness is encouraged in at least one of the first and second depth extraction phases by: computing, in the first depth extraction phase, a first-stage disparity map for the first image, by optimizing a first cost function defined so as to: (i) encourage matching between pixels of the first image and pixels of the second image associated therewith by the first-stage disparity map, whilst (ii) penalizing deviations in disparity between nearby pixels of the first-stage disparity map, the set of support points determined from the first-stage disparity map in that event; and/or defining the second cost function in the second depth extraction phase so as to penalize deviations in disparity between nearby pixels of the second-stage disparity map.

Of course, changes in disparity between neighbouring pixels are not prevented completely, as changes in depth will occur within real-world scenes: whilst the penalization of deviation in disparity generally acts to discourage jumps in disparity, that effect may be overridden by sufficiently strong matching (and/or any other factors that contribute to the cost function).

Matching may be evaluated based on a matching score, which can in turn be defined for associated pixels in the target and reference images respectively based, for example, on their intensities, associated features (e.g. feature vectors defined over surrounding image patches for example), etc.

In embodiments, the second cost function may encourage the assignment of disparities to pixels in the second depth extraction phase such that the corresponding 3D locations satisfy a specified geometric relationship with respect to the surface prior.

For example, the specified geometric relationship may be that the corresponding 3D locations are within a predetermined radius of the 3D surface prior.

The second cost function may encourage matching between pixels of the first image and pixels of the second image associated therewith by the second-stage disparity map In the case that disparity smoothness is encouraged in at least the first depth extraction phase, then a first cost function is used with the features set out above.

In the case that disparity smoothness is encouraged in the second depth extraction phase, it may or may not be encouraged in the first depth extraction phase. Hence, in that event, in the first depth extraction phase, a first-stage disparity map for at least the first image may be computed by optimizing a first cost function which encourages matching between pixels of the first image and pixels of the second image associated therewith by the first-stage disparity map, wherein the first cost function optionally penalizes deviations in disparity between nearby pixels of the first-stage disparity map (i.e. the first cost function may or may not encourage smoothness if smoothness if encouraged in the second depth extraction phase).

In either event, the set of support points may be determined by applying robustness checks to disparities of the first-stage disparity map (in which smoothness may or may not have been encouraged), the set of support points corresponding to a reduced subset of pixels whose assigned disparities in the first-stage depth map satisfy the robustness checks.

In the first depth extraction phase, an additional first-stage disparity map may be computed for the second image, wherein the robustness checks may comprise at least one left-right (L-R) consistency check applied to the first-stage disparity map and the additional first-stage disparity map.

In the case that smoothness is encouraged in the first depth extraction phase, the first cost function may be optimized by an embedded processor using a reduced set of scan lines, each scan line defining a direction over which disparity deviations are penalized, whereby disparity deviations are not penalized in all possible directions.

The embedded processor may, for example, be an FPGA or a System-on-Chip (SoC) comprising an FPGA.

The above L-R consistency check may be applied to compute a first intermediate depth map for the first image, and the first depth extraction phase may further comprise: computing two further disparity maps for rotated versions of the first and second images, applying a second L-R consistency check to the two further disparity maps, thereby computing a second intermediate depth map for the rotated version of the second image, rotating the second intermediate depth map to counteract the rotation of the images, thereby determining a rotated second intermediate depth map for the second image, and applying a third consistency check to the first intermediate depth map for the first image and the rotated second intermediate depth map for the second image, thereby determining a reduced-bias disparity map for determining the set of support points.

The set of support points may be determined by applying support checking to the sparser depth map, to filter-out points determined to be inconsistent with neighbouring points.

The second-stage disparity map may retain disparities assigned to a reduced subset of pixels of the first-stage disparity map, the reduced subset of pixels corresponding the set of support points, wherein new disparity values are only assigned to the remaining pixels of the second-stage disparity map. That is to say, the disparities determined in the first depth extraction phase may be enforced in the second depth extraction phase.

The set of support points may be processed to selectively remove points therefrom based on a moving window operation (to provide a set of anchor points", i.e. the points remaining after the selective removal of points), the 3D surface prior determined from only the points which have not been removed (i.e. from the anchor points).

The moving window operation may comprise: locating a window for processing a starting point of the set of support points, removing any other point within the window corresponding to the same disparity as the starting point, and iteratively repeating for any remaining points of the set of support points.

The support points may be received in a stream for performing the moving window operation and the window may be located for processing each point such that the window does not contain any points received after that point in the stream.

Pixels of the second-stage disparity map corresponding to the set of support points may have fixed disparities in the second-stage depth map, which are not varied as the second cost function is optimized. That is to say, the set of support points determined in the first depth extraction phase may be enforced in the second depth extraction phase.

In the second depth extraction phase, each of at least some pixels of the second depth-map may be assigned a disparity from a set of available disparities, with the set of available disparities determined from the support points.

Each pixel may be assigned to a grid cell and a set of available disparities may be determined for each grid cell from a subset of the support points corresponding to that grid cell.

The set of available disparities for each grid cell may be restricted to disparities corresponding to the subset of support points.

The set of available disparities for each grid cell may correspond to 3D points that satisfy a geometric constraint with respect to the 3D surface prior.

In the above example, in which the set of support points is further reduced to provide the set of anchor points, the 3D surface prior may be determined from the anchor points, and the set of available disparities may be determined from the support points rather than the anchor points (i.e. before further points have been selectively removed).

Smoothness may be enforced in both of the first and the second depth extraction phases.

In the first depth-extraction phase, the set of support points may be at least partially determined from another modality of sensor data captured substantially simultaneously with the stereoscopic image pair. For example, the other modality of sensor data may comprise LiDAR data.

In another such aspect of the present invention, a method of extracting depth information from a stereoscopic pair of images comprises:
in a first depth extraction phase, computing at least one disparity map for a stereoscopic image pair, enforcing smoothness as above (the above cost function may be referred to as a first cost function in this context), and thereby determining a set of support points in three-dimensional (3D) space;
using the set of support points to determine a 3D surface (surface prior);
in a second depth extraction phase, computing a further disparity map for the stereoscopic image pair, by assigning, to each of at least some of the pixels in at least one of the images, a new disparity which optimizes a second cost function, wherein the second cost function penalizes deviation from the 3D surface (or, equivalently, encourages fitting to the 3D surface).

The new disparity assigned to a pixel defines, together with the pixel's (x,y) location, a corresponding 3D location associated with that pixel; the second cost function penalizes deviation froth the 3D surface in that it encourages the assignment of a disparity to each pixel such that the corresponding 3D location is on or near (e.g. within a predetermined radius of) the 3D surface (that is, for example, within a predetermined radius of any point on the 3D surface prior). That is to say, the second cost function encourages the assignment of disparities to the pixels in the second depth extraction phase such that the corresponding 3D locations satisfy a specified geometric relationship with respect to the surface prior.

The effect can be seen as an "energy well" effect in the energy function around the plane surface, which encourages the assignment of disparities at or near the plane surface during fitting.

The second cost function may additionally encourage matching and/or smoothness in the same way as the first cost function, but additionally encourages fitting to the 3D surface.

In order to determine the set of support points, preferably the disparities assigned in the first depth extraction phase are evaluated based on one or more robustness criteria. That is, preferably at least one robustness check is applied to the disparities computed in the first depth extraction phase to limit the set of support points to disparities that satisfy the at least one robustness check. Any disparities which do not meet the one or more robustness criteria (i.e. which do not satisfy the at least one robustness check) may be excluded, and the set of support points may be determined from only the disparities which are determined to meet those criteria. Hence the set of support points preferably corresponds to a potentially sparse subset of the pixels to which disparities are assigned in the first phase, i.e. only the pixels whose assigned disparities satisfy the robustness check(s) (the rest may be discarded).

The robustness Check(s) may comprise at least one L-R (left-right) consistency check, wherein in the first depth extraction phase, a first disparity map is computed for the first image as above (with the first image as the target and the second image as the reference) and a second disparity map is computed for the second image (with the second image as the target and the first image as the reference). The first and second depth maps are compared for consistency (using a set of consistency criteria), and inconsistent disparities are excluded.

Preferably, however, additional consistency checks are performed to further exclude unreliable disparities, and thereby determine a highly robust, albeit sparse, set of support points. Further disclosure relating to this is provided below.

In a second such aspect of the invention, a method of extracting depth information from a stereoscopic pair of images comprises:

in a first depth extraction phase, computing at least one disparity map for a set of pixels of a stereoscopic image pair, and thereby determining a set of support points in 3D space;

using the set of support points to determine a 3D surface (surface prior);

in a second depth extraction phase, computing a further disparity map for the stereoscopic image pair, by assigning, to each of at least some of the pixels of the stereoscopic image pair, a new disparity which optimizes a cost function, wherein the cost function:

(i) penalizes deviation from the 3D surface, and
(ii) encourages smoothness as above.

The cost function in the second depth extraction phase may also encourage matching as above.

Any of the above features presented in relation to the first aspect or any other aspect of the invention may also be implemented in embodiments of the second aspect.

In embodiments of any of the above aspects, the 3D surface may be determined by fitting the 3D surface to the support points, for example using Delaunay triangulation. The surface may be represented as a surface mesh. By way of example, reference is made to A. Geiger, et. al. "Efficient large-scale stereo matching," in Computer Vision—ACCV 2010; Springer, 2010, pp. 25-38, which is incorporated herein by reference in its entirety. This discloses stereo-processing technology based on slanted plane priors determined using Delaunay triangulation, which may be referred to herein as ELAS. The 3D surface may be computed as disclosed therein. In contrast to ELAS, the above aspects of the present invention impose smoothness constraints in addition to plane/surface fitting which has been found to improve the accuracy of the disparity maps produced in the second depth extraction phase significantly.

A third aspect of the invention provides a method of extracting depth information from a stereoscopic pair of images, the method implemented in an image processing system and comprising:

in a first depth extraction phase, computing at least one disparity map which assigns disparities to a set of pixels of a stereoscopic image pair;

applying robustness checks to the at least one disparity map in order to determine a set of support points in 3D space corresponding to a reduced subset of the pixels whose assigned disparities satisfy the robustness checks;

using the set of support points to determine a 3D surface;

in a second depth extraction phase, computing a further disparity map for the stereoscopic image pair, wherein the further disparity map retains the disparities assigned to the subset of pixels in the first depth extraction phase, wherein new disparity values are only assigned to the remaining pixels in the second depth extraction phase.

In embodiments of any of the above aspects of the invention, what are referred to herein as "grid vector" constraints may also be imposed to limit the possible disparities that may be assigned to a given pixel in the second depth extraction phase based on the disparities assigned in the first phase. In some embodiments, these may be assigned as in or similar to ELAS (some optimizations to the ELAS grid vector determination/encoding are described below). Each pixel may be assigned to a grid cell and a grid vector may be defined for that grid cell comprising only any disparities assigned to pixels corresponding to the support points (this may optionally be encoded using one-hot encoding for efficient FPGA implementation as described later). That is, where the robustness check is used to limit the support points, only the disparities in the grid cell which satisfy the robustness checks may be included in the grid vector, i.e. the disparities that may be assigned in the second depth extraction phase in a given grid cell are restricted based on the disparities in that grid cell that appear in the sparse depth map as determined in the first depth extraction phase. This in turn limits the possible disparities which may be assigned to the remaining pixels in the grid cell. This can be a hard (strict) or soft enforcement. Hard constraints may also be relaxed where a surface prior is used, to allow the assignment of disparities in the second phase which are sufficiently close to the surface prior (i.e. which satisfy the specified geometric relationship with respect to the surface prior), even if those disparities would otherwise be excluded based on the sparse depth map from the first phase.

In embodiments of the third aspect, the first and/or second depth extraction phase can be performed in accordance with the first and/or second aspects of the invention or any embodiment thereof.

A fourth aspect of the invention provides a method of extracting depth information from a stereoscopic pair of images, formed of a first image and a second image, the method implemented in an image processing system and comprising: in a first depth extraction phase, computing at least one first-stage disparity map which assigns disparities to a set of pixels of a stereoscopic image pair; applying robustness checks to the at least one first-stage disparity map in order to determine a reduced subset of the pixels whose assigned disparities satisfy the robustness checks; in a second depth extraction phase, computing a second-stage disparity map in which at least some pixels of the stereoscopic image pair are each assigned disparities from a set of available disparities, the set of available disparities being determined based on the first depth extraction phase disparities which satisfied the robustness checks; wherein disparity smoothness is encouraged in at least one of the first and second depth extraction phases by: computing the first-stage disparity map in the first depth extraction phase by optimizing a first cost function defined so as to: (i) encourage matching between pixels of the first image and pixels of the second image associated therewith by the first-stage disparity map, whilst (ii) penalizing deviations in disparity between nearby pixels of the first-stage disparity map; and/or computing the second-stage disparity map in the second depth extraction phase by optimizing a second cost function defined so as to penalize deviations in disparity between nearby pixels of the second-stage disparity map.

In embodiments of the third and fourth aspects, the first, second and/or third depth extraction phases may be performed in accordance with the first and/or second aspects of the invention or any embodiment thereof.

Smoothness may or may not be enforced in the method of the third aspect (i.e. it may be enforced in one or both of the depth extraction phases, or neither depth extraction phase). Similarly, plane fitting may or may not be enforced in the third or fourth aspects.

Features set out above in relation to embodiments of the first and second aspects may be implemented in embodiments of the fourth aspect (including the case where smoothness in not enforced), such as the example robustness checks, support checks, grid vector constraints etc.

For example, in the first depth extraction phase, an additional first-stage disparity map may be computed for the second image, wherein the robustness checks may comprise at least one left-right (L-R) consistency check applied to the first-stage disparity map and the additional first-stage disparity map.

The robustness checks may comprise support checking, to filter-out pixels determined to be inconsistent with neighbouring pixels.

Another aspect of the invention provides a method of extracting depth information from a stereoscopic pair of images which comprises:
in a first depth extraction phase, computing at least one disparity map which assigns disparities to a set of pixels of a stereoscopic image pair;
applying robustness checks to the at least one disparity map in order to determine a reduced subset of the pixels whose assigned disparities satisfy the robustness checks (robust disparities);
in a second depth extraction phase, computing a further disparity map in which at least some pixels of the stereoscopic image pair are each assigned disparities from a set of available disparities, the set of available disparities being determined based on the first depth extraction phase disparities which satisfied the robustness checks (i.e. based on the robust disparities);
wherein at least one of the first and second depth extraction phases enforces smoothness in the manner disclosed above.

In embodiments, different sets of available disparities may be determined for different image portions, based on any robust disparities assigned to pixels in that image region in the first depth extraction phase.

A set of support points corresponding to the subset of pixels may be used to compute a surface prior as above, and the set of available disparities may also be determined based on the surface prior.

When smoothness is applied in conjunction with grid vector constraints and/or plane fitting as above, the effect is to cause propagation of the effects of the grid vector constraints and/or plane fitting within the depth map, which has been found to contribute to improved accuracy.

Embodiments of the invention may use a form of smoothness penalization that only considers a subset of scan line directions. Given a current pixel, each scan line lies in the direction of a different neighbouring pixel. The majority of image pixels each have 8 neighbouring pixels, lying in 8 different scan line directions relative to the current pixel. SGM may consider contributions along all 8 scan lines when encouraging smoothness in the cost function. However, there exist variants of SGM that can be viably implemented on an FPGA in part because they use a reduced set of scan lines (e.g. 3 or 4 scan lines only). An example of such a SGM variant is referred to as "R³SGM" (see below).

A problem that can arise in R³SGM and other forms of SGM that use a reduced set of scan lines is referred to herein as "raster scan bias". This is a bias that arises from the restriction of the directions over which the extraction process is performed. A solution to this problem is to introduce a consistency check based on transformed versions of the images, wherein R³SGM is applied to the original images and separately applied to the same images rotated 180 degrees—both are also restricted to left-up, up and right-up (and possibly left, although left may also be excluded to improve throughput: see below), but for the rotated images that corresponds to left-down, down and right-down (and optionally right) in the original (unrotated image). This is illustrated by example in further detail below with reference to FIG. 3.

Both checks may individually suffer from raster scan bias, however the effect of that can be reduced by applying a consistency check to the disparity maps computed in the two R³SGM processes.

A fifth aspect of the present invention provides a disparity map consistency verification method implemented in an image processing system and comprising:
applying depth extraction processing to a stereoscopic pair of images in order to determine at least two disparity maps, wherein each of the disparity maps exhibits a different directional bias effect caused by the depth extraction processing; and
applying a consistency check to compare the at least two disparity maps, and thereby compute a reduced-bias disparity map, wherein the different directional bias effects cause inconsistences between the two disparity maps which are removed in the consistency check, thereby preventing the propagation of either of those directional bias effects into the reduced-bias disparity map.

One example way of implementing this is as described above, wherein the two disparity cost maps are each computed by applying a depth extraction method with an inherent directional bias (such as R³SGM), wherein the depth extraction method is applied to the stereoscopic image pair to determine a first depth map exhibiting an effect of the directional bias, and is also applied to a geometrically transformed version of the stereoscopic image pair to determine a second depth map, wherein the geometric transformation causes the inherent directional bias to introduce a different effect in the second depth map.

That is, in embodiments, a second of the depth maps may be determined from versions of the images rotated or otherwise geometrically transformed (e.g. flipped/mirrored etc.) relative to the images used to determine a first of the depth of the depth maps.

In order to perform the consistency check, a second geometric transformation may be applied to the second depth map to compensate for the geometric transformation of the images. For example, the second geometric transformation may be an inverse transformation thereof.

The geometric transformation could comprise a rotation (e.g. by 180 degrees) and/or a reflection of the images for example.

The above check can be implemented in embodiments of the previously disclosed aspects of the invention, as part of the process of determining the set of support points (which in turn are used to determine the surface prior). That is, the robustness check(s) referred to above may comprise the consistency check of the third aspect. The set of support points may correspond to the disparities which remain in the reduced-bias disparity map (i.e. discarding pixels whose disparities are removed due to the effect of directional bias).

Preferably, additional consistency checks are also performed in conjunction with the above consistency check. For example, as described later, an L-R consistency check may be applied to compute the first disparity map for the stereoscopic image pair (i.e. where two disparity maps are computed for the untransformed images, with the target and reference reversed for the second of those maps, and then consistency checked to compute the first disparity cost map) and L-R consistency check may also be applied to compute the second disparity cost map for the transformed stereoscopic image pair (in exactly the same way but with the geometrically transformed images).

Further aspects of the invention provide an image processing system and computer program configured to implement any of the above methods.

Note that any features disclosed in relation to any of the above aspects or any embodiments therefore may equally be implemented in embodiments of any of the other aspects of the invention disclosed herein.

Whilst the above techniques can be implemented purely in software, preferably they are implemented using a combination of CPU (central processing unit) and FPGA (field-programmable gate array) processing. The image processing system may comprise processing hardware configured to implement any of the above methods, wherein the processing hardware may comprise one or more processors (such as one or more CPUs) coupled to an FPGA fabric, which implement different parts of the method as described later.

A program in this context may therefore comprise circuit description code stored on a computer-readable storage medium for configuring a field programmable gate array to implement at least part of the functionality disclosed herein and/or executable instructions for execution on a processor (CPU etc.) to implement at least part of the functionality.

Further aspects provide an image processing system comprising processing hardware configured to implement any method herein, where the processing hardware may for example comprise at least one FPGA or other embedded processor and at least one CPU and a computer program for programming the image processing system thus, which may for example comprise circuit description code for programming the FPGA and executable instructions for programming the CPU. The computer program may be embodied in non-transitory computer readable media.

A sixth inventive aspect herein provides a "cascaded" or, equivalently, "multi-pass" median filtering architecture. This may, in embodiments, be applied to one or more of the above depth maps. However, the architecture can be applied more generally in any image processing context (stereo and non-stereo), and is not limited in its application to the above image processing system architecture or to any particular image processing architecture disclosed herein.

The sixth aspect provides a filter configured to apply multi-pass median filtering to an image based on a 2D window, the filter embodied as a set of hardware blocks in a digital logic circuit, the set of hardware blocks comprising: a first hardware block comprises an input configured to receive a pixel stream of the image; a second hardware block comprises an input coupled to an output of the first hardware block; wherein the first hardware block is configured to apply first directional median filtering to the stream of pixels based on a first sub-window of the 2D window, so as to compute first median values for initial pixel values of the pixel stream, and provide the first median values to the second hardware block in a first median value stream whilst subsequent pixel values of the pixel stream are still being received and filtered at the first hardware block; and wherein the second hardware block is configured to apply second directional median filtering, based on a second sub-window of the 2D window, to the first median values of the first median value stream as they are received, simultaneously with the filtering of the subsequent pixel values by the first hardware block.

The present filter is able to substantially match or even exceed the accuracy of a standard single-pass 2D median filter whilst requiring quadratically fewer resources on the digital logic circuit.

in embodiments, the digital logic circuit may be a field-programmable gate array (FPGA) or application-specific integrated circuit (ASIC).

In embodiments, the set of of hardware blocks may comprise a third hardware block comprising an input coupled to an output of the second hardware block, wherein the third hardware block may be configured to apply third directional median filtering, based on a third sub-window of the 2D window, to initial second median values of the second median value stream before subsequent second median values of the second median value stream have been computed by the second hardware block.

The first, second and (where applicable) third hardware blocks apply first, second and (where applicable) third passes of the multi-pass median filtering. In further embodiments, additional pass(es) may be applied by one or more additional hardware blocks.

At least one of the sub-windows may be a single row, column or diagonal of the window.

At least one of the sub-windows may be a +−pattern sub-window or a x-pattern sub-window, the +−pattern sub-window defined as the union of a row of the window with a column of the window, the x-pattern sub-window defined as the union of two diagonals of the window.

For example, one of the sub-windows may be a single row, another of the sub-windows may be a single column, and yet another of the sub-windows may be a +−pattern sub-window (applied in any order).

This particular choice of sub-windows has been empirically found to outperform conventional 2D median filtering in terms of accuracy, whilst requiring quadratically fewer resources on the FPGA.

However, in other embodiments, any combination of two, three or more than three of the above-referred to sub-windows may be used.

Another aspect provides an image processing system comprising: an input configured to receive an image; and the filter of the sixth aspect or any embodiment thereof, configured to apply said multi-pass median filtering to the image.

Another aspect provides an image processing system comprising: a first input configured to receive a first image of a stereo pair; a second input configured to receive a second image of the stereo pair; processing hardware configured to process the first and second images, and thereby compute at least one depth or disparity map, the processing hardware comprising the filter of the sixth aspect or any embodiment thereof, configured to apply said multi-pass median filtering to at least one of: the first image, the second image, and the depth or disparity map.

The processing hardware may be configured to implement the method of any of the first to fifth aspect or any embodiment thereof.

Another aspect provides circuit description code embodied on transitory on non-transitory media and configured to program a set of hardware blocks of a field-programmable gate array to implement the above filter.

In embodiments, the method of any of the first to fifth aspects may comprise using the above filter to apply said multi-pass median filtering to at least one of: the first-stage disparity map, and the second-stage disparity map.

BRIEF DESCRIPTION OF FIGURES

For a better understanding of the present invention, and to show how embodiments of the same may be carried into effect, reference is made to the following figures, in which.

DETAILED DESCRIPTION

Figure 1:
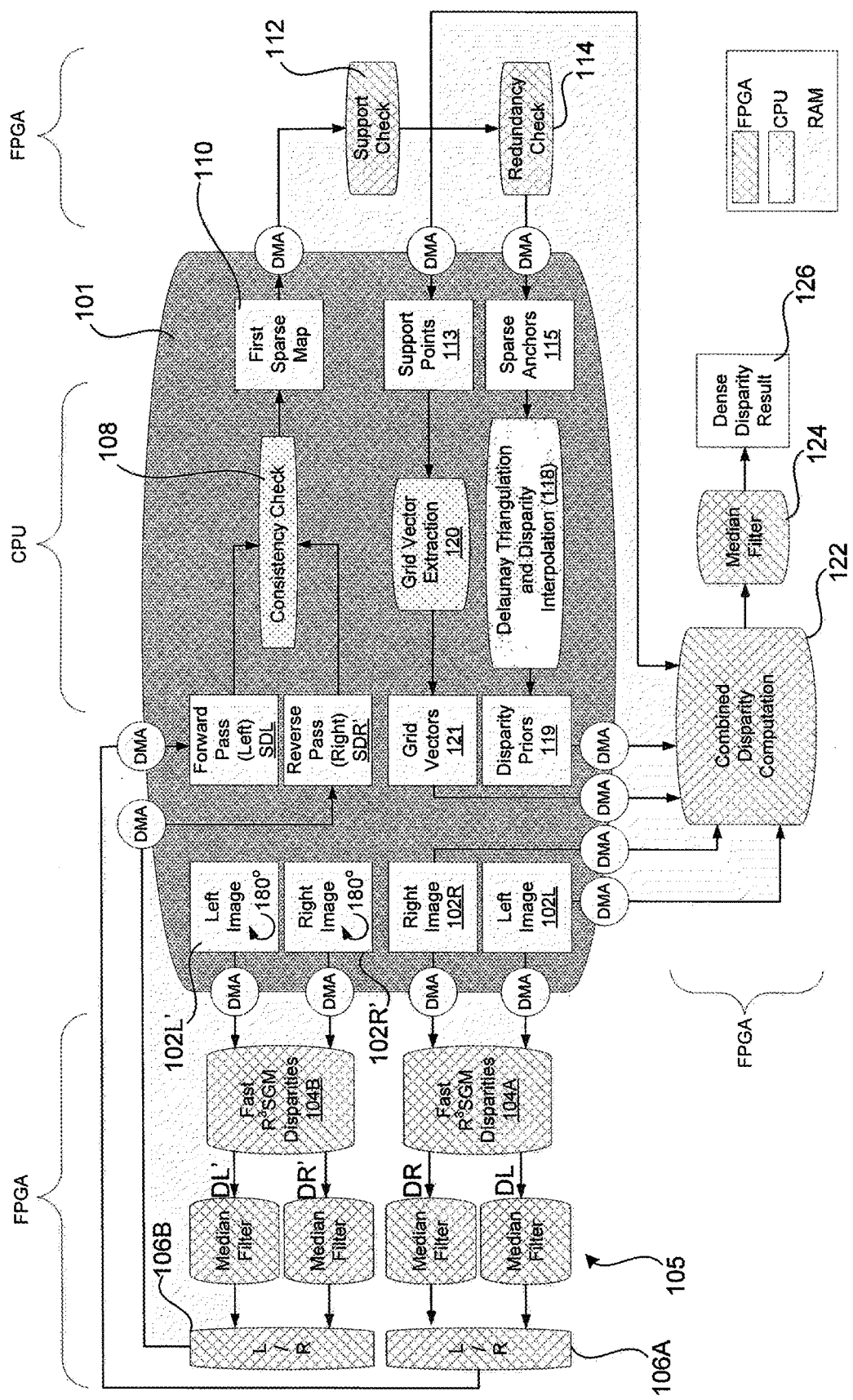
FIG. 1 shows a schematic function block diagram of an image processing pipeline implemented in an image processing system.

By way of context, reference is made to International Patent Application No. PCT/EP2019/061426 and United Kingdom Patent Application Nos. GB 1807392.4 and GB1808637.1, and to O. Rahnama, et. al. "R3SGM: Real-time Raster-Respecting Semi-Global Matching for Power-Constrained Systems," in FPT, 2018, each of which is incorporated herein by reference in its entirety. The aforementioned references disclose an implementation of depth extraction which is optimized for FPGA implementation, which may be referred to herein as $R^3SGM$. This is based on Semi-Global Matching (SGM) (referred to herein as full SGM for disambiguation) which is outlines in the above and described in further detail for example in H. Hirschmuller, "Stereo processing by semiglobal matching and mutual information," IEEE Transactions on pattern analysis and machine intelligence, vol. 30, no. 2, pp. 328-341, 2008. which is incorporated herein in its entirety. These are examples of depth extraction techniques which enforce smoothness, and either of which can be applied in the present context to that end. In full SGM, this is based on a scan over (typically) eight cardinal directions in order to evaluate pairwise cost terms that penalize jumps in disparity. In $R^3$SGM the number of directions is reduced so that pixels in the target image are only influenced by other pixels in the target image that have already been processed in raster order—so left-up diagonal, up, right-up-diagonal and left, which can be performed efficiently in FPGA fabric, However, it has been found that additionally removing the left direction can result in increased throughput, hence there may be benefits to performing $R^3$SGM over three directions rather than four. This implementation of $R^3$SGM, with only three directions may be referred to herein as "Fast $R^3$SGM. Such directions may be referred to herein as directions of smoothing influence, as it is the pixels in the target image that lie along these directions relative to the current pixel that have a smoothing influence on the disparity assigned to the current pixel. The cost function penalizes deviations from the pixels adjacent the current pixels in the directions of smoothing influence.

I. Overview

Embodiments of the invention are described below. In the described embodiments, an overall depth extraction pipeline is implemented which can be summarized as follows:

1) In a first depth extraction phase, a sparse but accurate depth map is computed:
   a) Smoothness is enforced as above,
   b) Robustness checks are performed as above to ensure accuracy, at the cost of sparseness.
2) Plane fitting (ELAS) is performed with the sparse depth map as a prior.
3) Grid vectors are computed from the sparse depth map (constrains neighbouring disparities).
4) In a second depth extraction phase, a dense and accurate depth map is computed that
   a) Enforces smoothness again,
   b) Enforces plane fitting,
   c) Enforces grid vectors,
   d) Enforces sparse depth values from the first depth extraction phase (i.e. these are retained in the final cost map unaltered).

The pipeline is implemented at the hardware-level using a hybrid CPU-FPGA (Central Processing Unit-Field Programmable Gate Array) architecture.

The described pipeline provides highly accurate depth from stereo images in real time.

In some contexts, upper bounds on power consumption constrain the feasible hardware to embedded platforms such as FPGAs. There may be other practical contexts in which an embedded implementation is desirable. Whilst various stereo algorithms have been deployed on such platforms—usually cut down to better match the embedded architecture—certain key parts of the more advanced algorithms, e.g. those that rely on unpredictable access to memory or are highly iterative in nature, are difficult to deploy efficiently on FPGAs, limiting the depth quality that can be achieved.

To overcome these issues, the described pipeline leverages a hybrid FPGA-CPU chip to propose a novel, sophisticated, stereo approach that combines the best features of SGM and ELAS-based methods to compute highly accurate dense depth in real time. This approach has been tested and found to achieve an 8.7% error rate on the challenging KITTI 2015 dataset at around 50 FPS, with a power consumption of only around 5 W.

The pipeline targets not only accuracy, but also speed, aiming for real-time execution (e.g. 30-50 FPS) on an embedded platform.

Two solutions which, to date, have been considered separately in seeking a desired trade-off between speed and accuracy are Semi-Global Matching (SGM) and ELAS.

SGM computes initial matching hypotheses by comparing patches around pixels in the left and right images, then approximates a costly image-wide smoothness constraint with the sum of several directional minimisations over the disparity range.

By contrast, ELAS first identifies a set of sparse but reliable correspondences to provide a coarse approximation of the scene geometry, then uses them to define slanted plane priors that guide the final dense matching stage.

The novel stereo pipeline described herein efficiently combines the predictions of these two algorithms, achieving remarkable accuracy and overcoming some of the limitations of each algorithm. First, multiple passes of a fast SGM variant, left-right consistency checking and decimation are used to obtain a sparse but reliable set of correspondences. These are then used as support points for ELAS to obtain disparity priors from slanted planes. Finally, these disparity priors are incorporated into a final SGM-based optimisation to achieve dense predictions with high accuracy.

Elaboration capability of a built-in CPU is used to handle I/O and to execute part of the ELAS pipeline, while deploying all the other elaboration blocks on an FPGA.

The method implemented accords the pipeline as a whole will now be described in detail.

II. Method

FIG. 1 is a block diagram showing a schematic overview of the present approach.

The overall pipeline (system) is shown schematically in FIG. 1. The pipeline comprises several different components, which are described in the subsections that follow. In the following description, references to the relevant subsections appear in parentheses. The system leverages both parts of a FPGA-CPU hybrid System-on-Chip (SoC) to achieve optimal results.

The pipeline is shown to comprise electronic memory in the form of RAM (Random-Access Memory) accessible to both a CPU part of the chip (CPU) and an FPGA part (the FPGA).

The CPU and FPGA are not shown explicitly in FIG. 1. However, FIG. 1 shows various functional components (modules) and uses shading to indicate which of those components is implemented on the CPU and which of them is implemented on the FPGA. The shading scheme is defined in a key at the bottom-left of FIG. 1. Access to the memory 101 by the FPGA is provided via direct memory access (DMA), as denoted by the circles labelled "DMA".

Tasks that involve simultaneous processing of large blocks of data are run on the FPGA, since they benefit from the parallel processing capability of dedicated FPGA accelerators. In addition, they can take advantage of the FPGA accelerators internal ability to pipeline data so that multiple inputs are processed together in staggered fashion.

As shown in FIG. 1, in a first depth extraction phase, $R^3SGM$ is applied to a stereo image pair consisting of left and right images 102L, 102R. In some contexts, Fast $R^3SGM$ may be preferred due to the additional speed benefits, and all references to $R^3SGM$ herein include Fast $R^3SGM$.

Tasks that are very dynamic and un-predictable, which often involve many unforeseen or random accesses to external memory, are run on the CPU, since they benefit both from the significantly faster clock frequency of the CPU and its ability to access memory quickly in constant time (CPU memory accesses can be sped up even further via appropriate use of the cache).

First Depth Extraction Phase:

In a first depth extraction phase, $R^3SGM$ (see § II-A1) is used to compute disparity images for the input stereo pair (in raster and reverse-raster order), which are then subject to a left-right consistency check to obtain an accurate but sparse disparity map for the left input image (see § II-A2). The terms disparity map and disparity image are used interchangeably herein.

In the first depth extraction phase, a total of four disparity maps are computed—a first disparity map DR for the right image 102R ("right depth map"), a second disparity map DL for the left image 102L ("left depth map"), a third disparity map DR' for a rotated right image 102R' ("right-rotated depth map") and a fourth disparity map DL' for a rotated left image 102L' ("left-rotated depth map")— the rotated images 102R', 102L' being versions of the left and right images 102R, 102L rotated by 180 degrees. This is represented schematically by first and second $R^3SGM$ components 104A and 104B, implemented on the FPGA, which process the images 102L, 102S and the rotated images 102L', 102R' respectively—noting that each $R^3SGM$ component 104A, 104B computes two disparity maps—one of the applicable right image, and one for the applicable left image.

Two levels of left-right (L-R) consistent check are applied to the four first-stage disparity images DR, DL, DR', DL'. The former involved two individual consistency checks: a first L-R consistency check 106A applied to the disparity maps DR, DL computed for the (non-rotated) left and right images 102L, 102R respectively, and a second L-R consistency check applied 106B to the disparity maps DR', DL' computed for the rotated left and right images 102R' 102L' respectively. Both of the first and second consistency checks 106A, 106B are implemented on the FPGA. The first instance of $R^3SGM$ 104A together with the first consistency check 106A may be referred to as a raster pass, and the second instance of $R^3SGM$ 104B together with the first consistency check 106B may be referred to as a reverse raster pass.

As shown, each disparity image DL, DR, DL', DR' is subject to median filtering in a first median filtering stage 105 prior to the first-level consistency checks 106A, 106B.

The aim of each consistency check 106A, 106B is to remove pixels from one depth map that are inconsistent with the other. For example, in FIG. 1, the first consistency check 106A removes pixels from the left depth map DL that are inconsistent with the right depth map DR in order to produce a sparser forward pass depth map SDL for the unrotated left image 102L (the "forward pass"); the second consistency check 106B removes pixels from the right rotated depth-map DR' that are inconsistent with the left-rotated depth map DL' to produce a sparser reverse pass depth map SDR' for the rotated right image 102R' (the "reverse pass"). Note that "opposite" types of consistency checks are performed, i.e. one produces a left disparity map and the other produces a right disparity map. This facilitates the second level consistency check (see next paragraph). As an alternative to what is depicted in FIG. 1, the first consistency check 106A could produce a sparser depth map for the unrotated right image and the second consistency check 106B could provide a sparser depth map for the rotated left image. The forward and reverse pass depth maps are examples of "intermediate" depth maps.

At the second-level, a single consistency check 108 is performed on the CPU, between the forward pass depth map SDL and the reverse path depth map SDR'. The result is a single sparse depth map 110 (which will generally be even sparser than either of the forward and reverse pass depth maps SDL, SDR'). The single sparse depth map can be a depth map for either the right or left image 102L, 102R, with pixels removed that are inconsistent with the other depth map. It is assumed that the sparse depth map 110 is computed for the left image 102L in the following. However, it could equally be determined for the right image 102R and the description applied equally to that scenario.

In order to perform the second-level consistency check 108, the reverse pass depth map SDR' may be rotated 180 degrees to counteract the effect of the initial 180 rotation of the left and right images 102L, 102R. The purpose of this rotation is to counteract the effects of directional bias, as explained elsewhere in this disclosure.

Next, support checking 112 (see § II-B1) is performed to keep only those points whose disparities are sufficiently supported by surrounding pixels: this yields a support point image that is sparser than the disparity map and contains only points with confident disparities.

This image is then further "sparsified" by processing it in raster order and removing any point whose disparity has already been seen in a window behind and above it (see § II-B2): this yields an image containing (highly) sparse anchor points (anchor point image). This is referred to as a redundancy check and is denoted by reference numeral 114.

The support check 112 provides a relatively sparse set of "support points" 113 (support point image). These correspond to a reduced subset of pixels fn the left image 102L which have "survived" (i.e. not been removed/invalidated in) both levels of consistency check as well as the support check 112. This may be a relatively small subset of the left image pixels, however the surviving pixels will generally have very accurate disparities.

The redundancy check 114 further reduces the number of points (pixels) in the support set 113 to provide a set of "anchor points" 115 (anchor image).

Both the support check 112 and the redundancy check 114 can be implemented efficiently on the FPGA.

In this first depth extraction phase, accuracy is strongly favoured over density, and the first depth extraction phase may therefore be referred to as a sparse depth extraction phase. The first-level consistency checks 106A, 106B, the second-level consistency check 108 and the support check 112 have the effect of significantly increasing the overall accuracy of the support points 113, at the cost of reduced pixel density.

The redundancy check 114 to provide the sparse anchor points 115 is an optimization that improves the efficiency of the second-stage depth extraction (see below).

Second Depth Extraction Phase:

The output the sparse depth extraction phase is used as a prior in a second (dense) depth extraction phase. The support point image 113 is provided to a grid vector extraction module 120. The anchor image 115 is provided to a plane prior generation module 118. Those modules 118, 120 operate according to the general principles described in [8] (see § II-B3) to provide, respectively, a set of disparity priors 119 and a set of grid vectors 121. These modules 118, 120 are implemented efficiently on the CPU.

The set of disparity priors 119 constitute a 3D surface fitted to the anchor points 115, as described later. Triangulation is used to construct the 3D surface, and the disparity priors 119 take the form of plane priors 119 that make up the 3D surface, i.e. the 3D surface is constructed from a set of planar elements (the plane priors 119) using a form of triangulation.

A combined disparity optimisation 122 is performed based on the outputs of these modules 118, 120 and the original support points 113 to obtain a dense disparity image 126 (see § II-C).

Additional median filtering is applied to dense disparity image 126 at a second median filtering stage 124 to produce a final result (the median-filtered version of the dense disparity image 126).

The individual components of the first and second depth extraction phases will now be described in further detail.

A. Sparse Disparity Computation (First Stage)

1) Fast $R^3$SGM –104A, 104B

Initially, a modified version of $R^3$SGM is applied to compute disparity images for input stereo pairs. As noted above, this is a memory-efficient adaptation of classic SGM that is particularly well suited to an FPGA implementation. This may also be referred to as "Fast $R^3$SGM". Each input image pair is processed twice: once in raster order, and once in reverse raster order, yielding two disparity images overall (first-stage disparity maps). The advantage of this is that the raster and reverse-raster passes of $R^3$SGM will base the disparity for each pixel on the disparities of pixels in different regions of influence: this facilitates a later check for consistency between the two disparity images, improving the accuracy of the results. Fast $R^3$SGM may also be preferred in some cases for the second stage, i.e. with three directions of influence rather than four.

The original version of $R^3$SGM aggregated contributions to the disparity of each pixel along four different scanlines: three above the pixel, and one to the left. However, using the left scanline limits the overall throughput of the system (one disparity value is output every three clock cycles) due to a blocking dependency between immediately successive pixels. To avoid this, the approach is modified to use only the scanlines above the pixel, allowing the pipeline to output one disparity per clock cycle. The mild loss in accuracy this causes is more than compensated for by the improvements yielded by the rest of the pipeline.

2) Consolidating Consistency Checking:

Each pass of Fast $R^3$SGM outputs a disparity map that has been checked for consistency using the first input as the reference image.

As noted, the raster pass 104A, 106A outputs a disparity map SDL for the left input image; the reverse-raster pass 104B, 106B outputs a disparity map SDR' for the (reversed) right input image. Due to the streaming nature of the disparity computation, however, the results may suffer from a raster or reverse-raster scan bias, i.e. the disparity value of any given pixel may be encouraged to be similar to those computed before it.

To reconcile the inconsistencies between these two disparity maps, the further left-right consistency check 108 may be performed, which yields an accurate but sparse disparity map 110 for the left input image 102L as its result.

Due to the memory access patterns needed for this process (the first pixels in the left disparity map have to be checked against the last pixels in the reversed right disparity map), this step is optimally performed on the CPU. In addition, as this consistency check is not a window operation and only operates on single values, it benefits from the faster clock rate of the CPU and its ability to access any memory index with the same latency (ignoring the effects of caching).

Figure 3:
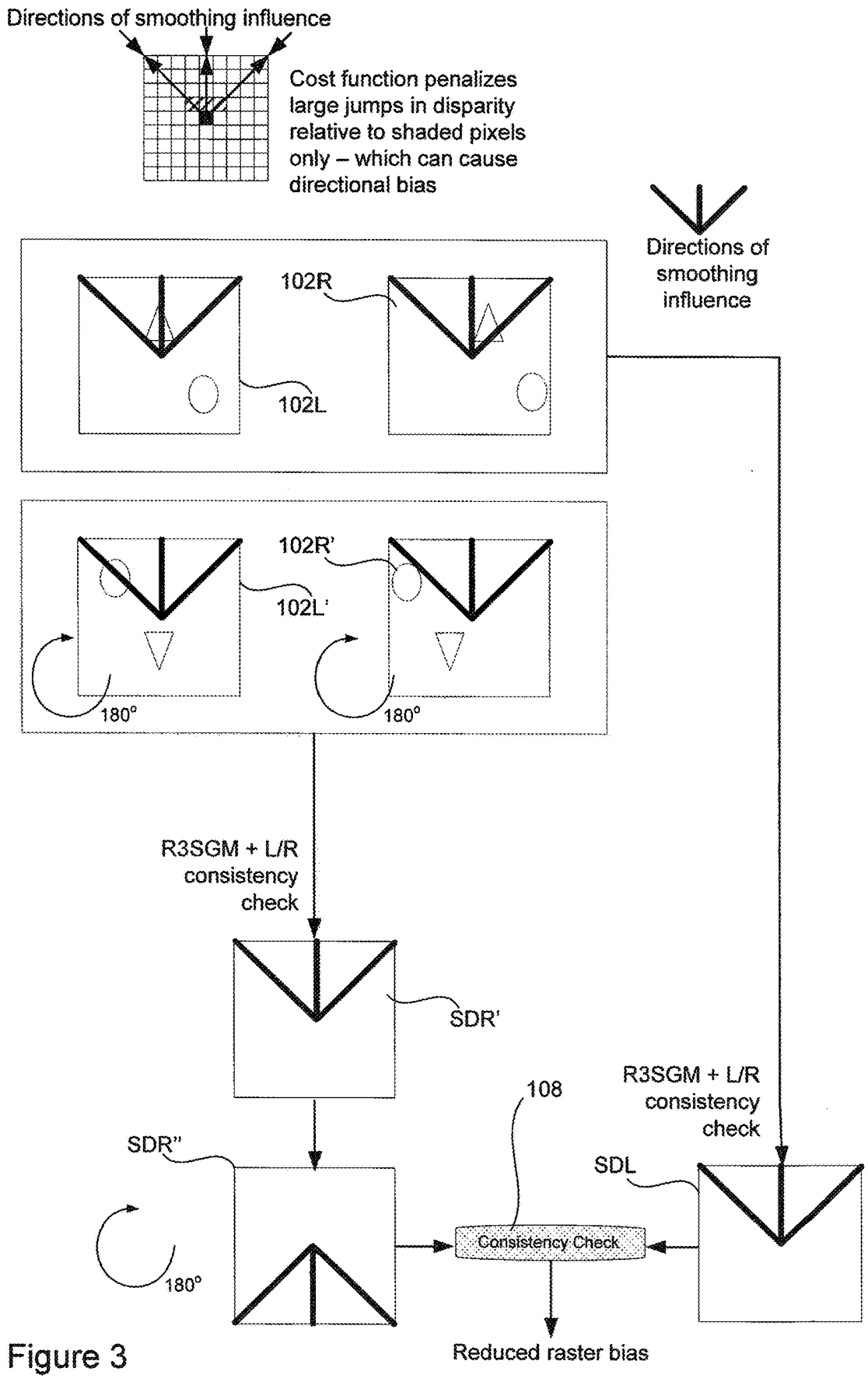
FIG. 3 schematically illustrates a left-right consistency check.

FIG. 3 illustrates the problem of raster scan bias, and the solution provided herein, in further detail. In $R^3$SGM and other forms of reduced-scan line SGM, when disparity costs are computed for a current pixel, those costs only take into account the disparities from a subset of neighbouring pixels. In the present example, this is the pixel directly above the current pixel and the pixels either side of the pixel directly above it. Hence, there are only three (out of a possible eight) directions that have a smoothing influence—north, north-west and north-east (N, NW, NE). These may be referred to as the directions of "smoothing influence".

This introduces a directional bias due to the increased influence of pixels towards the top of the images, which is an example of raster-scan bias.

It can be seen that, by additionally applying $R^3$SGM to the rotated images 102L', 102R', and then rotating the reverse pass depth map SDR' obtained from the second consistency check 106B by 180 degrees, the rotated depth map SDR" now corresponds to the unrotated left image 102L' (the two 180 degree rotations effectively cancelling each other out), but the directions of smoothing influence in the rotated depth map SDR" are now south, south-east and south-west (S, SW, SE). This has effectively "flipped" the directional bias in the rotated depth map SDR" relative to the forward pass depth map SDL computed from the unroasted images 102L, 102R. When the second-stage consistency check 108 is performed, inconsistencies between pixels of the forward pass depth image SDL and the rotated reverse pass depth image SDR", arising from the different directional biases, can be detected and the affected pixels removed or invalidated.

B. Generation of Priors

To further refine the sparse disparity map output 110 by the consolidating consistency check, an adapted version of the ELAS method described in [7] is used to produce grid vectors (by module 120) and disparity priors (by the plane prior generation module 118, using Delaunay triangulation in the present example) can be fed together with the sparse disparity map 110 (or more specifically the support point 113 thereof) into the combined disparity optimisation process 112 (see § II-C) to produce a more accurate and dense final result 126. This process takes two inputs: the support point image 113, which can be used to compute the grid vectors, and the sparse anchor image 115, which will be used as the basis for a Delaunay triangulation that can be used to generate disparity priors for all pixels in the image by linearly interpolating the depths of the anchoring points.

1) Support Checking:

To produce the support point image 113, the sparse disparity map 110 is filtered to remove any pixels whose disparity is not sufficiently supported by the pixels in their immediate neighbourhood (for example, a 5×5 or other suitable window centred on the pixel). For a pixel to be sufficiently supported, a possible stipulation is that at least 10 of the 24 surrounding pixels must have a disparity within 5 of the centre pixel's disparity. The disparities of all other pixels are marked as invalid. The resulting support point image 113 will generally be sparser than the original disparity map 110, since it has kept only those pixels with reasonably high-confidence disparities.

2) Redundancy Checking:

To produce the anchor image 115, the support point image 113 produced in § II-B1 is further sparsified by processing it in raster order and invalidating any pixel whose disparity has already been seen within a window behind and above the pixel. Unlike [8], which for each pixel (x, y) used a window of $$\{(x,y-\delta_y):0<\delta_y\leq 2K\}\cup\{(x-\delta_\infty,y):0<\delta_\infty\leq 2K\},$$

where K was set to 5, which only encompassed points in the same row or same column as the pixel being processed, in the present example a larger window is used, defined as $$\bigcup \begin{cases} \{(x+\delta_x, y+\delta_y) : -K \leq \delta_x \leq K, -2K \leq \delta_y < 0\} \\ \{(x-\delta_x, y) : 0 < \delta_x \leq K\}. \end{cases}$$

This has the effect of creating a sparser anchor image 115 than that used in [8], significantly speeding up the subsequent Delaunay triangulation process 118. Whilst this may reduce the accuracy of the depth priors 119, the final disparities 126 produced by the combined optimisation (see § II-C) have in practice been found to only loosely affected by the quality of the depth priors 119; as a result, and since the Delaunay triangulation process 118 is a key bottleneck, the present disclosure recognises the benefits of computing slightly less accurate depth priors 119 faster, rather than spending the extra time to compute more accurate depth priors that make little difference to the final result.

Figure 1A:
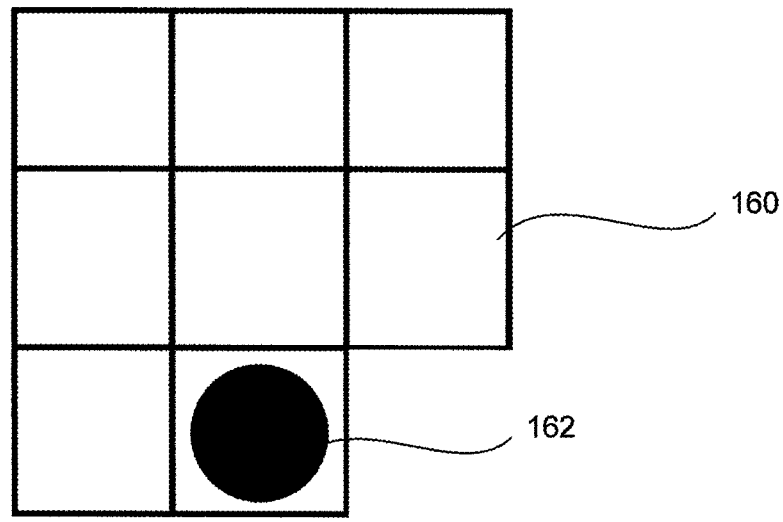
FIG. 1A shows an example of a window used to determine anchor points.

FIG. 1A shows an example of such a window 160 located for processing a current pixel 162. In this example, the window has dimensions of 3×3, but note that it excludes the pixel to the immediate right of the current pixel 162 (which will would come after the current pixel 162 when the pixels are streamed in raster order). The shape of the window 160 and its location relative to the current pixel 162 cause it to only encompass pixels before the current pixel 162 in the stream.

3) Disparity Prior Generation and Grid Vector Extraction:

Having computed the support point and anchor point images 113, 115, they are used to produce the disparity priors 119 and grid vectors 121 used by the combined disparity optimisation 112 described in § II-C.

To produce the disparity priors 119, first a Delaunay triangulation is computed, by the plane prior generation module 118, from the anchor points 115, and then the disparity of each non-anchor point within one of the Delaunay triangles is computed based on the disparities of the triangle's vertices.

The grid vector extraction module 120 produces the grid vectors 121 as follows. The support point image 113 is divided into regular grid cells, the disparities within each grid cell are collected, and those disparities and their neighbouring disparities (±1) are added to a grid vector for that cell.

Both modules 118, 120 apply the method described in [ ] and further details may be found therein.

C. Combined Disparity Optimisation

Finally, the combined disparity optimisation 112 is performed that takes into account not only the original pair of input images 102L, 102R, but also the plane priors 119, grid vectors 121 and support points 113.

This also uses a form of Fast $R^3SGM$, as in § 18 A 1, however the cost vectors of the pixels are modified to take the various different priors into account.

Disparities of the support points 113 are fixed throughout and not recomputed. Every cost vector element for a support point (each of which corresponds to a specific disparity) is set to a large arbitrary value, except for the element corresponding to the disparity of the support point, which is set to zero instead. Through the Fast $R^3SGM$ smoothing process, pixels near the support point will then naturally be encouraged to adopt disparities similar to that of the support point itself, with the influence of this effect attenuating with distance.

The disparity prior for each pixel may be taken into account by decreasing those elements of its cost vector that correspond to disparities close to the 3D surface prior 119 (more specifically, a negative Gaussian may be superimposed over the cost vector, centred on the prior, and the relevant elements within a certain radius are decreased accordingly).

Recall that each grid cell is associated with one of the grid vectors 121. To make use of the grid vectors, all elements of the cost vectors for the pixels within each grid cell that do not appear in the grid vector for that cell may be set to an arbitrarily large value, thus strongly encouraging them not to be selected. As with the effects of the support points, these cost vector modifications are similarly propagated by the Fast $R^3SGM$ smoothing process.

At the end of this process, a final median filter is performed on the Fast $R^3SGM$ result to further mitigate impulsive noise, ultimately yielding a dense, accurate disparity map.

III. Results

The described pipeline architecture has been tested by the Applicant as detailed below, and benchmarked in relation to state-of-the art methods.

For the purpose of the testing, we (the Applicant) developed the FPGA accelerators using the Vivado High-Level Synthesis (HLS) tool, as this approach was quicker, and allowed for greater flexibility and reusability of the components. We deployed the system on a Xilinx ZCU104 board, and all of the power consumption results that we present for the tested method were estimated by the Xilinx Vivado tool.

We quantitatively evaluate the disparities produced by our approach on the standard KITTI 2015 stereo benchmark [29], [30]. In Table I, we report the average percentages of pixel disparities estimated correctly (according to the dataset's own criteria of <3 px or <5% error from ground truth), for background, foreground and all pixels, respectively. We also report average runtimes and power consumptions for both the present method and alternative methods that achieve real-time processing speeds on the images used in the benchmark (which have a resolution of 1242×375). Whilst the proposed method results in slightly less accurate disparities than the DeepCostAggr and CSCT-SGM-MF methods, it is worth pointing out that both [31], rely on powerful GPUs to achieve real-time processing speed, whereas the present approach does so in a much more power-efficient manner, relying only on a hybrid FPGA-CPU board. The present approach was also found to compare favourably to $R^3SGM$ [12], providing more accurate and denser results at a similar speed and with similar power consumption. The present approach was also found to outperform the FPGA variant of ELAS [8], achieving a lower error rate at a much higher speed, and with similarly low power consumption.

In Table 11, we detail the hardware resources used by the present approach when deployed on a Xilinx ZCU104 board. Table II provides a breakdown of the amount of logic resources used in the FPGA chip, as well as the power consumption of both the programmable logic and the ARM core. Notably, despite making full usage of many of the logic resources available on the FPGA, our power consumption remains extremely low.

Tables I and II referred to above are annexed to this description.

It will be appreciated that the specific implementation described above is illustrative but not exhaustive.

For example, an alternative implementation could incorporate one or more other sensor modalities into the depth extraction process, such as LiDAR, RADAR etc. For example, LiDAR is able to provide sparse but typically accurate depth information, and could therefore be used in the first depth-extraction phase in the determination of the support points 113 and the anchor points 115. Appropriate LiDAR registration can provide pixel depth information in the frame of reference of the desired image.

Example Application

Numerous computer vision applications, including 3D voxel scene reconstruction, object recognition, 6D camera re-localisation, and autonomous navigation, either rely on, or can benefit from, the availability of depth to capture 3D scene structure.

For example, in the field of robotics, mobile robotic systems that can autonomously plan their paths in complex environments are becoming increasingly prevalent. An example of such a rapidly emerging technology is autonomous vehicles (AVs) that can navigate by themselves on urban roads. Other mobile robots are being developed, for example for carrying freight supplies in internal and external industrial zones. Such mobile robots would have no people on board and belong to a class of mobile robot termed UAV (unmanned autonomous vehicle). Autonomous air mobile robots (drones) are also being developed.

A specific example context in which the technology disclosed herein may be applied is autonomous driving. Other applications include mobile robotics and robotic systems generally.

An autonomous vehicle is provided comprising: at least one stereoscopic image capture apparatus; the above image processing system, which is coupled to the stereoscopic image capture apparatus for applying any of the image processing steps disclosed herein to stereoscopic image pairs captured thereby; and a control system configured to control the operation of the autonomous vehicle based on the results of the applied image processing steps.

An autonomous vehicle, also known as a self-driving vehicle, refers to a vehicle which has a sensor system for monitoring its external environment and a control system that is capable of making and implementing driving decisions autonomously using those sensors. This includes in particular the ability to automatically adapt the vehicle's speed and direction of travel based on inputs from the sensor system. A fully autonomous or "driverless" vehicle has sufficient decision-making capability to operate without any input from a human driver. However the term autonomous vehicle as used herein also applies to semi-autonomous vehicles, which have more limited autonomous decision-making capability and therefore still require a degree of oversight from a human driver.

Autonomous decision making is a critical function of an autonomous vehicle. This is true whatever its level of autonomy, but as the level of autonomy increases, so too does the complexity of the decisions it needs to be able to make safely, to the point where a fully autonomous vehicle needs to be equipped with an exceptionally robust decision-making engine that can be relied upon to safely handle any driving scenario it encounters, however unexpected. To be able to do so, it is important that the processing of the sensor signals that feeds into the decision making is not only sufficiently accurate, but also fast and robust enough to be able to make decisions sufficiently quickly and reliably.

Figure 2:
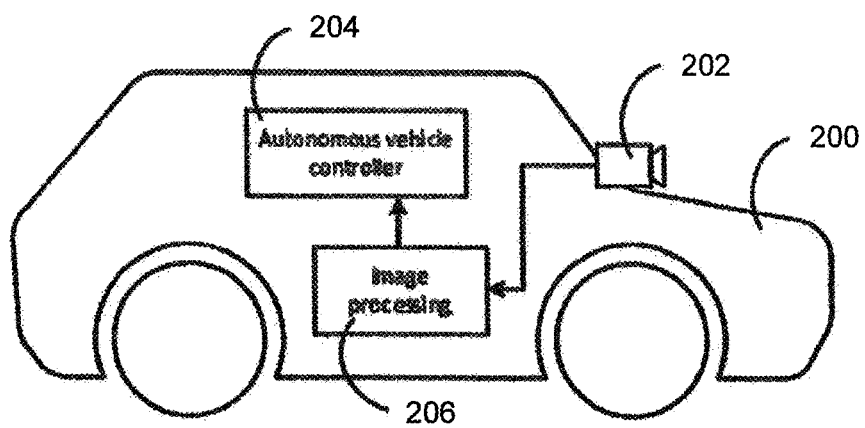
FIG. 2 shows a highly-schematic function block diagram of an autonomous vehicle.

FIG. 2 shows a highly-schematic block diagram of an autonomous vehicle 200, which is shown to comprise an image processing system 206, having an input connected to at least one image capture device 202 of the vehicle's sensor system and an output connected to an autonomous vehicle control system (controller) 204. In use, the image processing system 206 of the autonomous vehicle 200 processes images captured by the image capture device 202, in real time, and the autonomous vehicle controller 204 controls the speed and direction of the vehicle based on the results, with no or limited input from any human. The vehicle 200 is a car in this example, but it can be any form of vehicle. The image capture device 202 is a stereoscopic image capture device, comprising a pair of stereoscopic image capture units for capturing stereoscopic image pairs. Various image processing functions can be performed by the image processing system 206, such as visual structure detection and spatial depth extraction.

One context in which the invention can be implemented is as a component of the image processing system 206, in order to provide fast and robust spatial depth detection within the autonomous vehicle 200. In this context, the depth information extracted from stereoscopic image pairs captured by the image capture device 202 is used by the control system 204 as a basis for autonomous decision making, in conjunction with other image processing such as visual structure detection (e.g. detection of roads, objects etc.).

Although only one image capture device 202 is shown in FIG. 2, the autonomous vehicle could comprise multiple such devices, e.g. forward-facing and rear-facing image capture devices.

The control system 204 can control various subsystems of the vehicle based on the decisions it makes, including the engine and wheels via a suitable drive mechanism.

As will be appreciated, the above is a highly simplified description of certain autonomous vehicle functions. The general principles of autonomous vehicles are known, therefore are not described in further detail.

IV. Median Filtering

In the above-described image processing system, median filtering is applied to the first to fourth disparity images DL, DR, DL', DR' at the first median filtering stage-105 and additional median filtering 124 is applied to the dense disparity map 126 at the second median filtering stage 124 to convert it to its final filtered form. At both stages, a form of 2D median filtering is applied to the applicable image(s).

A novel method of median filtering is described below that is particularly well-suited to an FPGA implementation. The method can be applied at one or both of the median filtering stages 105, 124, on the above-mentioned FPGA.

It is noted, however, that 2D median filtering has broad applicability in image processing and computer vision, and the described median filter method and architecture is not limited in its application to the above image processing system, or even to stereo imaging generally, but can be usefully applied in many other image processing/computer vision contexts.

Figure 4:
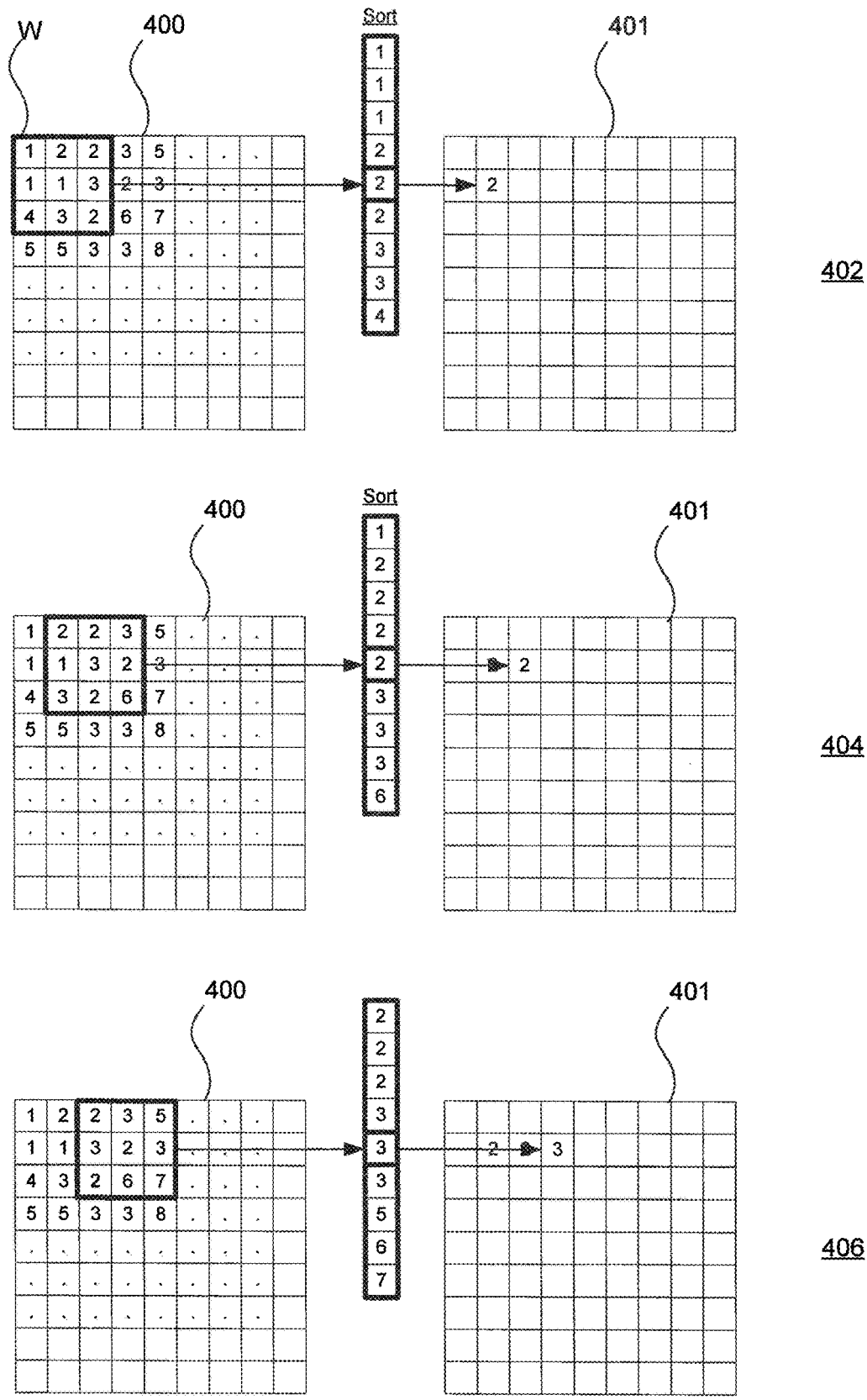
FIG. 4 shows an example of 2D median filtering.

By way of context, FIG. 4 shows a conventional "single-pass" 2D median filtering method applied to an image 400 based on a window W of size m×n (m=n=3 in this example), in order to compute a filtered image 401. In the above context, the image 400 could correspond to any one of the depth images DL, DR, DL', DR', 126.

The image 400 is formed of a 2×2 array of pixel values. In the present example, the median filtering commences (step 400) with the window W located at the top-left of the image 400.

The pixel values within the window W are sorted into a sequence ordered by value such that the median value will always be located at a central position of the sequence. That median value is provided as a corresponding pixel value of the filtered image 401. In this example, the window W is shown to slide horizontally in units of one pixel at each subsequent step 404, 406, . . . and, although not shown explicitly in FIG. 4, upon reaching the other side of the image 400, the window W would slide down by one pixel and repeat a horizontal slide, one pixel at a time, across the width of the image 400. This process repeats until the window reaches the bottom-right corner of the image 400.

FPGAs are flexible devices that enable power-efficient and real-time implementations of algorithms through dedicated hardware logic. However, they are limited in what they can achieve by the amount of hardware resource that is available on the device. As a result, there is a balance between how resource-intensive an FPGA accelerator is and the resulting throughput that is achieved.

2-D median filtering is a well-established image-filtering technique with widespread use throughout computer vision. For example, two-dimensional median filtering may be used in image processing for removing impulsive noise in images without causing too much blurring.

Despite its relative algorithmic simplicity, accelerating the 2D median filter via a hardware implementation becomes increasingly challenging as the-window size increases, since the resources required grow quadratically with the window size. As a real-time hardware accelerator, the 2D median filter scales very poorly with window size, especially when prioritising for speed and throughput.

The novel median filtering method described herein substitutes a single-pass conventional 2-D median filter on an FPGA with a sequence of directional median filters, and in so doing achieves better scalability and hardware efficiency without sacrificing accuracy. The approach allows for much higher throughput and is easier to implement as a pipeline.

Figure 5:
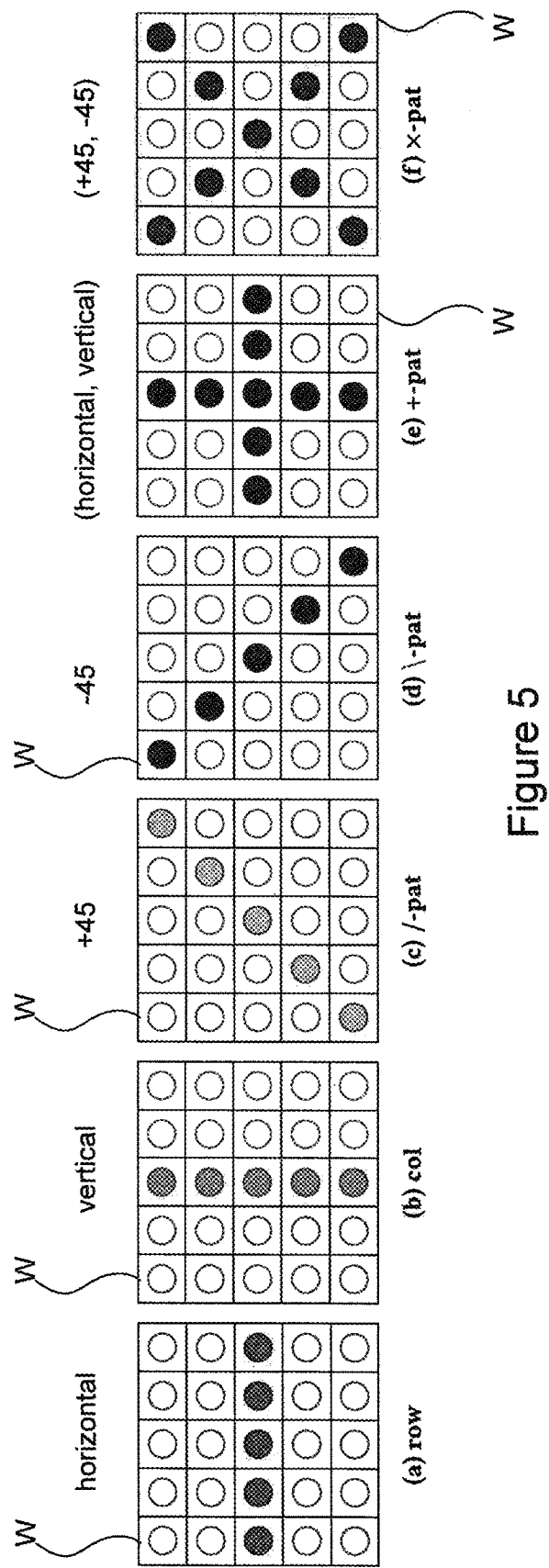
FIG. 5 shows a set of directional median filters.

FIG. 5 shows a set of six possible directional median filters that may be applied in this context, labelled row, col,/-pat, \-pat, +-pat and x-pat respectively.

When referring to a target n×n 2-D median filter, the first four of these directional medians (row, col,/-pat and \-pat) are computed over n values, whereas the last two (+-pat and x-pat) are computed over 2n-1 values. Each filter determines the median value of only a subset of n or 2n-1 pixels within the n×n window.

The term "directional" refers to the fact that each directional filter is dependent on pixel values lying along a subset of pixel lines. There are four pixel lines in total: horizontal and vertical lines plus the two lines at 45 degrees to horizontal/vertical (denoted as +45 and -45). The pixel lines are defined as all intersecting a common origin at the centre of the window W (i.e. at the pixel at the centre of the window). The row, col,/-pat and \-pat filters are each restricted to a single pixel line—horizontal, vertical, +45 and -45 respectively; the +-pat and x-pat filters are each restricted to two pixels lines— (horizontal, vertical) and (+45, -45) respectively.

For each of the directional filters, a subset of shaded pixels within the window is shown. The shaded pixels are the pixels that lie on the applicable pixel line subset i.e. the subset of pixels lying on the one or two pixel lines to which that filter is restricted, within the window W. Each of the directional median filters computes the median value out of the subset of shaded pixels only (so, the row filter computes the median of only the n pixels lying on the horizontal pixel line within the window W, the col filter computes the median of only the n pixels lying on the vertical pixel line within the window W, etc.; the +-pat filter computes the median of only the 2n-1 pixels lying on at least one of the horizontal and vertical pixel lines etc.).

When any one of the direction filters is applied across an input image, the eventual result is a filtered version of the image. A particular form of "cascaded" (or, equivalently, "multi-pass") median filtering is described below, in which at least one of the directional median filters will be applied to the filtered image resulting from the application of another of the directional median filters.

Whereas the complexity of conventional single-pass 2D median filtering scales quadratically with window size, i.e. as $O(n^2)$, each of the six directional filters scales linearly in n, i.e. as $O(n)$, and can therefore be implemented more efficiently particularly with large windows. In particular, each directional filter can operate with significantly reduced memory requirements (increased memory efficiency).

As described below, acceptable results can be achieved using a selection of two of these directional median filters, and optimal results can be achieved using a selection of three of these six filters.

In particular, a combination of the row, col and +-pat directional median filters, in any order, has been empirically shown to outperform conventional 2D median filtering in terms of accuracy, whilst requiring quadratically fewer resources on the FPGA (see Section V. below). However, acceptable results may also be attained using a different combination of directional median filters. Results are provided for window sizes ranging from 3×3 to 15×15, from which it can be seen that replacing 2-D median filtering with a particular sequence of directional median filters is not only vastly more resource-efficient, but also more accurate.

This has significant practical implications for FPGA applications that use median filtering. For one thing, it means that a much larger window size can be used for the median filtering itself without exceeding the available resources on the FPGA. Moreover, it frees up resources for other tasks on the FPGA, avoiding the need for costly workarounds such as block re-use that limit throughput.

This specific sequence of directional median filters is any permutation of a +–patterned median (+–pat), a column median (col) and a row median (row). It has also been found that the combination of a row median and a column median (in either order) may be used if more resource savings are desired, albeit at a cost in accuracy in some cases.

It is emphasised, however, that in general any combination of two, three or more than three of the directional median filters may be used to achieve acceptable results.

The median filtering method will now be described in further detail, together with an FPGA hardware architecture for efficiently implementing the method.

Whilst standard median filters, whether 1-D or 2-D, compute the median element in a single pass, other forms of "multi-stage" median filtering methods have been explored in the past. However, unlike previous works that involved a multi-stage (multi-level) median, the cascaded median filtering applied herein does not combine the different outputs from these medians via an additional median process, but instead passes the outputs of each stage from one stage to the next in a successive fashion. In contrast to existing multi-stage median filtering techniques, the present approach of cascaded median filtering is therefore more straightforward for FPGA implementation and allows the order of the medians in the sequence to be varied straightforwardly.

Figure 6:
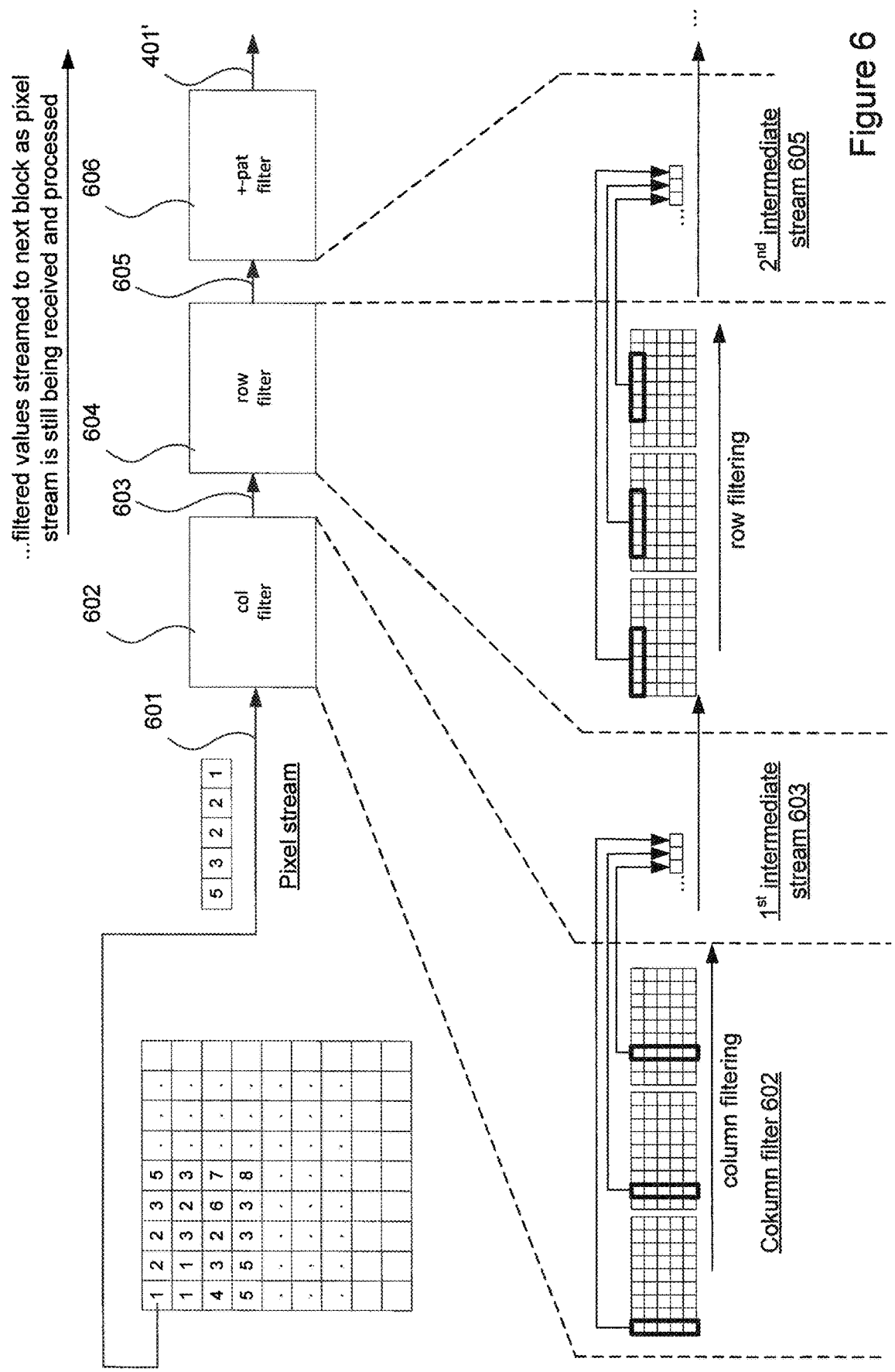
FIG. 6 shows an example of "cascaded" median filtering.

FIG. 6 shows a schematic block diagram of an FPGA hardware architecture for implementing the method using the three directional median filters (col, row, +–pat). In the example of FIG. 6, those filters are applied in that order by first, second and third hardware blocks 602, 604, 606 of the FPGA respectively (though, as noted above, the directional median filters can be applied in any order). The hardware blocks 602, 604, 606 are configured as column, row and +–pattern median blocks respectively (i.e. they are configured to apply the col, row and +–pat basic filters respectively).

The hardware blocks 602, 604 and 606 are communicatively coupled by interconnect logic (not shown), such as programmable interconnect logic, which connects an output of the first hardware block 602 to an input of the second hardware block 604, and an output of the second hardware block 604 to an input of the third hardware block 606. An input of the first hardware block 602 is configured to receive a pixel stream 601 of an image 400 ("original" image) to be filtered, e.g. via the interconnect logic, e.g. from another hardware block of the FPGA (such an I/O block—not shown). An output of the third hardware block 606 provides a stream of final filtered values (final stream), which are pixel values of a median filtered version of the image 401'. The first hardware block 602 provides a first stream of intermediate filtered values 603 (first intermediate stream) to the second hardware block 604, as computed by applying column filtering to pixels of the pixel stream 601. These are pixel values of a first intermediate filtered image to which the next directional median filter is applied. The second hardware block 602 provides a second stream of intermediate filtered values 605 (second intermediate stream) to the third hardware block 606, as computed by applying row filtering to values of the first intermediate stream 603 (i.e. to the first intermediate filtered image). These are pixel values of a second intermediate filtered image, to which the final directional median filter is applied. The third hardware block 606 computes the final stream by applying +–patterned median filtering to values of the second intermediate stream 605 (i.e. to the second intermediate filtered image). In combination, the hardware clocks 602, 604, 606 cooperate to form a median filtering chain.

This filtering architecture allows each hardware block 602, 604, 606 to commence its filtering operations before it has received all of the pixel values of the applicable image (respectively, the original image 400 whose pixel values are streamed as the pixel stream 601, the first intermediate filtered image whose pixel values are streamed as the first intermediate stream 603 and the second intermediate image whose pixel values are streamed as the second intermediate stream 605). Therefore, each hardware block 602, 604, 606 can begin processing initial values of its respective input stream 601, 603, 605 before subsequent values of that stream have been received. The second and third hardware blocks 604, 606, can begin processing initial values of the first and second intermediate streams 603, 605 before subsequent values of those streams have been computed by the preceding block (the first and second blocks 602, 604 respectively).

Compared to a typical multi-stage filter, such an FPGA implementation may require additional BRAM to repeatedly store the values, but it requires much less complex hardware design overall. This is attributed at least in part to the fact that the number of required comparisons has decreased substantially. Having the individual median filtering operations occur in this successive fashion means that as soon as one value is output from a stage, it is immediately read in to the subsequent filter. As a result, the pixels of any image being processed are not only being pipelined in a particular hardware median block, but also across the cascade of hardware blocks that make up the median filtering chain. This makes the approach more suitable for an efficient, flexible, fast and highly-pipelined FPGA hardware accelerator.

The core operation that a median filter performs is that of sorting an array of elements and selecting the midpoint value. Numerous different ways have been proposed to efficiently sort arrays in hardware.

Figure 7:
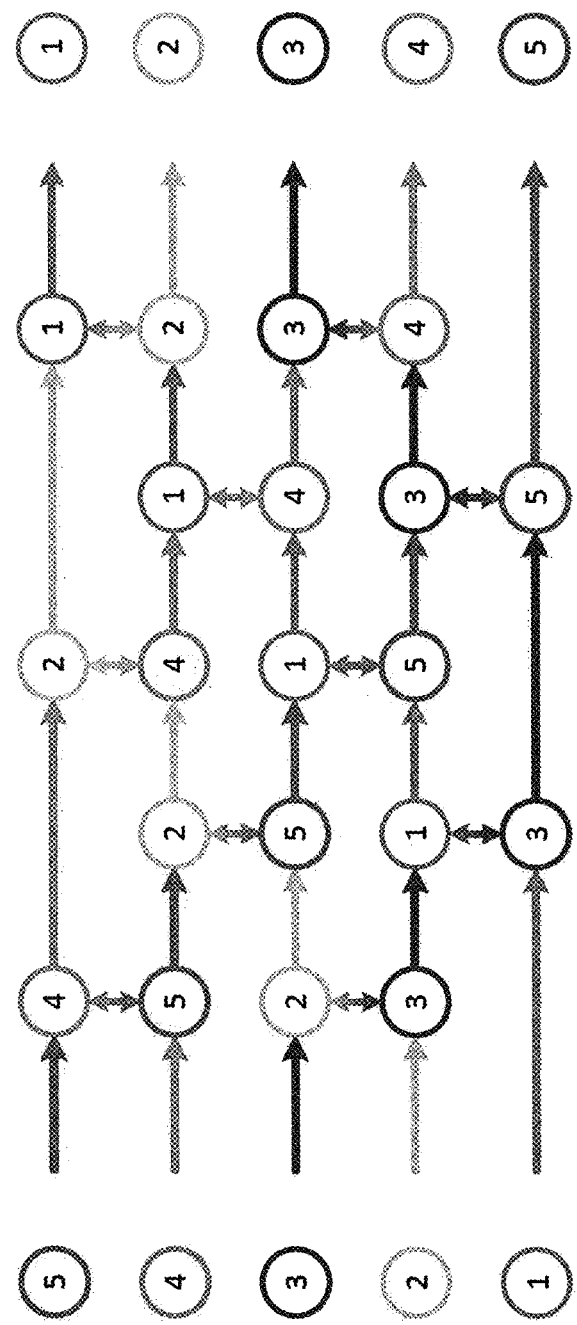
FIG. 7 shows an example of a sorting network.

This particular example uses an even-odd transition network shown schematically in FIG. 7, which has the benefit of being both simple and capable of being implemented very efficiently on an FPGA. For further details of a possible FPGA implementation of this sorting algorithm see Valery Sklyarov and Iouliia Skliarova; 2014; High-performance implementation of regular and easily scalable sorting networks on an FPGA. Microprocessors and Microsystems 38, 5 (2014), 470-484, which is incorporated herein by reference in its entirety.

There may be reasons to use alternative sorting approaches for some applications, e.g. to take advantage of any greater resource efficiency they might offer. In practice, any desired sorting algorithm can be used because the present median filtering method is in practice entirely agnostic to the way in which the elements are sorted. On a practical level, the kind of directional median sequence described herein can be implemented with any type of sorting algorithm or network, and is expected to provide the same advantages over traditional 2D median filtering in each case.

V. Median Filtering Results

To synthesise the FPGA hardware accelerators, we used Xilinx's Vivado High Level Synthesis (VHLS) tool and targeted the ZC706 development board. The resources available on the FPGA portion of this ARM/FPGA system-on-chip are listed in Table 3 annexed to this description. By using VHLS, we are able to rapidly iterate over median filters with different window sizes and produce resource utilisation estimates. In less than 100 lines of C++ code and through the efficient use of pragmas, the design of the different median-filtering blocks is straightforward and compact. The choice of odd-even transition sorting as the sorting method of choice also significantly simplifies the implementation.

To evaluate our approach, we compared the performance of numerous different sequences of directional medians with that of a standard median filter on the black-and-white versions of the 24 images available in the Kodak Loss True Color Image Suite. Each image in this dataset has the same large (6.3 mega-pixel) resolution (i.e. 3072×2048 or 2048×3072).

Further details of the image set may be found in Kodak. 2019. Kodak Lossless True Color Image Suite (available at http://0k.ux/graphics/kodick/at the time of writing), which is incorporated herein by reference in its entirety.

To determine which sequences of directional medians, if any, perform the same as or better than the standard 2-D median filter, each possible permutation of the six basic filters, up to a sequence length of four filters, was tested. As there were six possible directional medians from which to select (see FIG. 5), the overall number of tested combinations was $$\sum_{i=2}^{5} \frac{6!}{i!} = 516.$$

Each filter sequence (including the standard 2-D filter, denoted as "std") was evaluated for (odd) window sizes ranging from 3×3 to 15×15. We refer to a pair consisting of a filter sequence and a window size, e.g. (row‖col, 3×3), as a variant of our approach for the rest of these experiments.

To ensure that the performance of any given filter sequence was fairly evaluated, it was important to test its noise suppression ability for varying amounts of noise. Since a key use of median filtering is to remove impulsive noise, many works assess the performance of median filter variants using images to which "salt and pepper" noise has been added. Whilst this does indeed simulate malfunctioning pixels in an image sensor, it is a specific case, and not fully representative of the broader set of tasks for which a median filter can be used. We thus opt, instead, to test our filter sequences using images to which Gaussian noise has been added, but in a "salt and pepper" fashion. In particular, for 24 images taken from the Kodak dataset we generate a set of 50 derived images, each of which has had a varying amount of Gaussian noise added to a fraction of its pixels. More precisely, for each base image, we vary the fraction of pixels affected by this noise from 0% to 100% in 10% increments, and we also vary the standard deviation of the added Gaussian noise by setting it to either 1, 5, 10, 20 or 50 pixels. The values of the pixels in the images are also clipped to between 0 and 255 to ensure that the addition of the noise doesn't cause them to become of range. For the rest of these experiments, we will refer to each of the 24×50=1200 derived images generated in this manner as a target on which the performance of each of our variants will be evaluated.

With regards to the synthesis of the equivalent hardware accelerators, we design a circuit for every base type of median filter (the six depicted in FIG. 1, as well as the standard 2-D median). As the sequences of directional filters happen in succession, the resource utilisation of a particular sequence of filters is equivalent to the sum of the utilisations of the individual base median filters. Although the results from VHLS are only approximations and are generally pessimistic, they nonetheless illustrate the meaningful differences in the resource utilisations of the proposed approaches.

4.1 Performance Evaluation

One way of evaluating a median filter variant's performance on an individual target is to calculate the mean-squared error (MSE) between the result of filtering the target image (i.e. the one corrupted by noise) and the corresponding base image from the original dataset. However, the mean-squared errors for different targets are not directly comparable, and so it would be inappropriate to simply average them across all targets to obtain an average performance measure for the variant over the entire augmented dataset. To circumvent this problem, we normalise the MSEs for each target by dividing each MSE by the MSE of the best-performing variant on its target, and then average these normalised errors over all targets.

More formally, let V be the set of all median filter variants we consider, T be the set of all targets, and MSE(v, t) denote the MSE of v ∈ V on target t ∈ T. We can then define the normalised MSE of v on t as $$nMSE(v, t) = \frac{MSE(v, t)}{\min_{v' \in V} MSE(v', t)}.$$

The overall performance S(v) of v on the dataset can then be defined as the average nMSE over all targets, i.e.

$$S(v) = \frac{1}{|T|} \sum_{t \in T} nMSE(v, t).$$

The smaller S(v) is, the better the overall performance of v (the smallest S(v) can be is 1, which corresponds to v having achieved the best MSE on all targets).

We report the S(v) values for all multi-pass variants of our approach that consistently outperformed a 2-D median filter in Table 4 annexed to this description. Notably, any 3-pass sequence consisting of a row, col and +–pat directional median filter (in any order) significantly outperforms the standard 2-D median filter, as do both 2-pass sequences involving row and column medians.

4.2 Hardware Resource Utilisation

Table 5 compares the growth in resource utilisation of the different median filters across the different window sizes. As shown, all of the directional medians occupy only a small proportion of the overall FPGA resource. Even with a 15×15 window size, both the row and column medians occupy at most 1% of the LUTs. Similarly, even though the +–pattern and x-pattern medians occupy almost 3 times more LUT resources, they still only account for a fraction of the available resources. By contrast, the resource requirements of the classic 2-D median filter grow quadratically, so that at a window size of 15×15, the tool is no longer able to synthesise the design or fit it within the resources of the FPGA.

Notably, the BRAM utilisation for each type of median is the same, with the exception of the row median, which does not require any BRAMs. This is because these 18K BRAMs are used to store previous rows of pixels for median operations that span more than one row. These hardware resources are excellent at storing large quantities of data, but only allow one read/write operation per clock cycle. Since every directional median except the row median spans n columns, this implies n−1 full horizontal lines of the image must be stored at any one moment. In addition, as the horizontal resolution of the largest images is 3072 pixels, with an 8-bit pixel depth, a single BRAM per row is insufficient to store the entire row of pixels (one BRAM can store at most 18000/8=2250 pixels). As a result, a minimum of two BRAMs must be used per row, meaning that the BRAM utilisation for all medians other than the row median ends up being consistently 2(n−1) for a window size of n×n. The row median only accesses the row over which it needs to be computed, and as a result, has no need for BRAMs.

The flip-flop (FF) utilisation grows with the number of pipeline stages that are necessary within a given type of median filter. This separation of operations into separate stages enables the FPGA block to process a new value on every clock cycle. The intermediate values from previous inputs pass between the different pipelined sub-stages through the flip-flops. Depending on the clock cycle used, which establishes the maximum permissible delay between operations, the number of pipeline stages will vary. Practically, referring back to FIG. 2, if more than one set of comparisons can be achieved within the provided clock cycle, then fewer flip-flops will be needed. Conversely, if the clock frequency is so high that only one set of comparators can compute within the clock period, then many more flip-flops will be utilised to store the intermediate values. In our designs, we set the operating frequency to 100 MHz, which results in an output FPS over the images from the Kodak dataset (3072×2048) of >15 FPS.

The number of comparators required for an n×n 2D window median is $$\frac{n^2}{2} \times n^2 = \frac{n^4}{2},$$

where n is the window size. By contrast, when using a column or row directional median, the number of comparators required is $$\frac{n}{2} \times n = \frac{n^2}{2}.$$

Similarly, for the +-pattern and x-pattern medians, which have almost twice as many elements as the row and column medians, the number is proportional to $$\frac{2n-1}{2} \times (2n-1) = 2\left(n - \frac{1}{2}\right)^2.$$

Using a sequence of directional medians involves summing the different resource utilisations; however, for most window sizes, this sum is still significantly less than the resource requirements of the standard 2-D median.

4.3 Discussion

Using VHLS made rapidly iterating through the different directional median filters and window sizes straightforward and fast. However, when it came to synthesising standard 2-D median filters with window sizes of 11×11 and 13×13, VHLS would terminate before completing and warn about excessive loop unrolling in the most compact version of the code, where the appropriate pragmas were utilised to unroll and pipeline different functions together. To overcome this problem, it was necessary to manually unroll these portions of the code. As a result, although VHLS offered a rapid way to synthesise and prototype designs, its conservative verification sometimes limited what was synthesised, despite it being possible in practice. Nevertheless, for the purposes of this work, even its pessimistic estimates highlighted the key point of the work.

Annex—Results Tables:

TABLE I

The quantitative results of our approach, in comparison to state-of-the-art GPU-based real-time methods, on the Stereo 2015 subset of the KITTI benchmark [29], [30]. As in the official evaluation protocol, we report the percentage of accurate disparities (using a threshold of <3 disparity values or 5%, whichever is greater) after an interpolation step (meant to assign a disparity value to all pixels in the image), on respectively the subsets of background, foreground and all pixels. We additionally report the density of valid disparity values. As can be seen, with the exception of R³SGM [12], all methods provide almost dense disparity images, therefore the extra interpolation step mandated by the benchmark (which is performed on the CPU, at evaluation time) is not strictly required to obtain usable disparity images. Finally, for each method, we report the typical time required to process a stereo pair, as well as the approximate power consumption of the platform used. Whilst all approaches can process images in real-time, only the FPGA-based methods (ours and [12]) can do so in a power-efficient manner, with ours providing ≈12% additional accuracy and much higher density w.r.t [12], at the expense of slightly higher power usage and processing time.

| Method | Background | Foreground | All | Density | Runtime (s) | Environment | Power Used (W) |
|---|---|---|---|---|---|---|---|
| Ours | 7.2% | 17.3% | 8.7% | 99.7% | 0.019 | FPGA (Xilinx ZCU104) | 4.5 |
| R³SGM [12] | — | — | 9.9% | 85.0% | 0.014 | FPGA (Xilinx ZC706) | ≈4 |
| ELAS-FPGA [8] | — | — | 13.6% | — | 0.095 | FPGA (Xilinx ZC706) | ≈3 |
| DeepCostAggr [31] | 5.3% | 11.4% | 6.3% | 99.98% | 0.03 | Nvidia GTX Titan X | ≈250 |
| CSCT + SGM + MP [15] | 6.9% | 14.9% | 8.2% | 100% | 0.006 | Nvidia GTX Titan X | ≈250 |

TABLE II

The resources (programmable logic units) and power (as estimated by the Xilinx Vivado tool) used by the proposed approach, when deployed on a Xilinx ZCU104.

| Resource Usage | |
|---|---|
| LUT Utilisation | 87.5 |
| FF Utilisation (%) | 24.1 |
| BRAM Utilisation (%) | 70.7 |
| FPGA Power Consumption (W) | 1.72 |
| CPU Power Consumption (W) | 2.78 |
| Total Power Consumption (W) | 4.5 |

TABLE 3

The resources available on the FPGA portion of a Xilinx ZC706 development board.

| Resource Type | Available Amount |
|---|---|
| Look-Up Tables (LUT) | 218600 |
| Flip Flops (PF) | 437200 |
| DSP48 Blocks | 900 |
| Block RAM (18K) | 1090 |

TABLE 4

The average normalised MSEs, over all targets (base image/noise configuration) in our augmented dataset, of each multi-pass median filtering variant (filter sequence/window size) that consistently outperformed the standard 2-D median across all window sizes we tested.

|  | 3 × 3 | 5 × 5 | 7 × 7 | 9 × 9 | 11 × 11 |
|---|---|---|---|---|---|
| std | 1.799 | 3.335 | 5.099 | 6.650 | 7.940 |
| row→col | 1.648 | 2.879 | 4.467 | 5.934 | 7.193 |
| col→row | 1.653 | 2.894 | 4.496 | 5.978 | 7.249 |
| row→col→ + −pat | 1.582 | 2.886 | 4.525 | 6.012 | 7.272 |
| row→ + −pat→col | 1.552 | 2.794 | 4.368 | 5.811 | 7.045 |
| col→row→ + −pat | 1.589 | 2.906 | 4.560 | 6.059 | 7.328 |
| col→ + −pat→row | 1.566 | 2.841 | 4.451 | 5.920 | 7.171 |
| + −pat→row→col | 1.565 | 2.737 | 4.275 | 5.683 | 6.885 |
| + −pat→col→row | 1.563 | 2.735 | 4.280 | 5.696 | 6.904 |

TABLE 5

The FPGA resource utilisations at different windows sizes for the various different median filtering patterns we use, in comparison to the standard pattern. The first row for each pattern shows the absolute utilisation of a particular resource, and the second row shows the utilisation as a percentage of the available total, in each case rounded to the nearest integer. Note that for window sizes larger than 13 × 13, the LUT usage for the standard pattern becomes prohibitive, and so we only show results up to that size for that pattern. By contrast, the resource utilisation for all of our patterns grows linearly rather than quadratically, allowing them to be used even for window sizes such as 15 × 15. Note that, in the bottom portion of the table, the order of the directional medians is not important, i.e. the values for row‖col are valid for both row→col and col→row.

|  | 3 × 3 | | | 5 × 5 | | | 7 × 7 | | | 9 × 9 | | |
|---|---|---|---|---|---|---|---|---|---|---|---|---|
|  | BRAM | FF | LUT | BRAM | FF | LUT | BRAM | FF | LUT | BRAM | FF | LUT |
| std | 4 | 936 | 1201 | 8 | 1987 | 5254 | 12 | 4663 | 18414 | 16 | 10382 | 49262 |
| (%) | 0 | 0 | 0 | 0 | 0 | 2 | 1 | 1 | 8 | 1 | 2 | 22 |
| row | 0 | 454 | 519 | 0 | 660 | 692 | 0 | 741 | 944 | 0 | 785 | 1244 |
| (%) | 0 | 0 | 0 | 0 | 0 | 0 | 0 | 0 | 0 | 0 | 0 | 0 |
| col | 4 | 644 | 622 | 8 | 692 | 726 | 12 | 780 | 890 | 16 | 861 | 1114 |
| (%) | 0 | 0 | 0 | 0 | 0 | 0 | 1 | 0 | 0 | 1 | 0 | 0 |
| /-pat | 4 | 617 | 613 | 8 | 740 | 722 | 12 | 963 | 918 | 16 | 1323 | 1206 |
| (%) | 0 | 0 | 0 | 0 | 0 | 0 | 1 | 0 | 0 | 1 | 0 | 0 |
| \-pat | 4 | 687 | 645 | 8 | 980 | 850 | 12 | 1305 | 1078 | 16 | 1344 | 1238 |
| (%) | 0 | 0 | 0 | 0 | 0 | 0 | 1 | 0 | 0 | 1 | 0 | 0 |
| +-pat | 4 | 924 | 845 | 8 | 985 | 1174 | 12 | 1295 | 1834 | 16 | 1666 | 2734 |
| (8) | 0 | 0 | 0 | 0 | 0 | 0 | 1 | 0 | 0 | 1 | 0 | 1 |
| ×-pat | 4 | 660 | 717 | 8 | 1040 | 1174 | 12 | 1648 | 1962 | 16 | 1826 | 2734 |
| (%) | 0 | 0 | 0 | 0 | 0 | 0 | 1 | 0 | 0 | 1 | 0 | 1 |
| row‖col | 4 | 1098 | 1141 | 8 | 1352 | 1418 | 12 | 1521 | 1834 | 16 | 1646 | 2358 |
| (%) | 0 | 0 | 1 | 1 | 0 | 1 | 1 | 0 | 1 | 1 | 0 | 1 |
| row‖col‖+-pat | 8 | 644 | 622 | 16 | 2337 | 2592 | 24 | 2816 | 3668 | 32 | 3312 | 5092 |
| (%) | 1 | 0 | 0 | 1 | 1 | 1 | 2 | 1 | 2 | 3 | 1 | 2 |

|  | 11 × 11 | | | 13 × 13 | | | 15 × 15 | | |
|---|---|---|---|---|---|---|---|---|---|
|  | BRAM | FF | LUT | BRAM | FF | LUT | BRAM | FP | LUT |
| std | 20 | 21957 | 109638 | 24 | 41403 | 213942 | — | — | — |
| (%) | 1 | 5 | 50 | 2 | 9 | 97 | — | — | — |
| row | 0 | 728 | 1528 | 0 | 913 | 2052 | 0 | 944 | 2529 |
| (%) | 0 | 0 | 0 | 0 | 0 | 0 | 0 | 0 | 1 |
| col | 20 | 973 | 1398 | 24 | 1074 | 1742 | 28 | 1194 | 2146 |
| (%) | 1 | 0 | 0 | 2 | 0 | 0 | 2 | 0 | 0 |
| /-pat | 20 | 1531 | 1458 | 24 | 1868 | 1834 | 28 | 2437 | 2366 |
| (%) | 1 | 0 | 0 | 2 | 0 | 0 | 2 | 0 | 1 |
| \-pat | 20 | 1852 | 1650 | 24 | 2178 | 2026 | 28 | 2377 | 2334 |
| (%) | 1 | 0 | 0 | 2 | 0 | 0 | 2 | 0 | 1 |
| +-pat | 20 | 2294 | 3938 | 24 | 2782 | 5286 | 28 | 3335 | 6874 |
| (8) | 1 | 0 | 1 | 2 | 0 | 2 | 2 | 0 | 3 |
| ×-pat | 20 | 2537 | 3938 | 24 | 3126 | 5286 | 28 | 3803 | 6874 |
| (%) | 1 | 0 | 1 | 2 | 0 | 2 | 2 | 0 | 3 |
| row‖col | 20 | 1701 | 2926 | 24 | 1987 | 3794 | 28 | 2138 | 4675 |
| (%) | 2 | 0 | 1 | 2 | 0 | 2 | 3 | 0 | 2 |
| row‖col‖+-pat | 40 | 3995 | 6864 | 48 | 4769 | 9080 | 56 | 5473 | 11549 |
| (%) | 4 | 1 | 3 | 4 | 1 | 4 | 5 | 1 | 5 |

REFERENCES

Reference may be made herein to the following, each of which is incorporated herein by reference in its entirety:
[7] A. Geiger, M. Roser, and R. Urtasun, "Efficient Large-Scale Stereo Matching," in *Computer Vision*—AC 2010. Springer, 2010, pp. 25-38.
[8] O. Rahnama, D. Frost, O. Miksik, and P. H. Torr, "Real-Time Dense Stereo Matching With ELAS on FPGA-Accelerated Embedded Devices," *IEEE Robotics and Automation Letters*, vol. 3, no. 3, pp. 2008-2015, 2018.
[12] O. Rahnama, T. Cavallari*, S. Golodetz*, S. Walker, and P. H. S. Torr, "R$^3$SGM: Real-time Raster-Respecting Semi-Global Matching for Power-Constrained Systems," in *FPT,* 2018.
[15] D. Hernandez-Juarez, A. Chacón, A. Espinosa, D. Vázquez, J. C. Moure, and A. López, "Embedded real-time stereo estimation via Semi-Global Matching on the GPU," *Procedia Computer Science, vol.* 80, 2016.
[29] M. Menze, C Heipke, and A. Geiger, "Joint 3D Estimation of Vehicles and Scene Flow," in *ISPRS Workshop on Image Sequence Analysis* (ISA), 2015.
[30], "Object Scene Flow" ISPRS *Journal of Photogrammetry and Remote Sensing* (JPRS), 2018.
[31] A. Kuzmin, D. Mikushin, and V. Lempitsky, "End-to-end Learning of Cost-Volume Aggregation for Real-time Dense Stereo," in LSP, 2017.

The invention claimed is:

1. An image processing system for extracting depth information from a stereoscopic pair of images, the stereoscopic image pair formed of a first image and a second image, the image processing system comprising:
 a first input configured to receive the first image of the stereoscopic image pair;
 a second input configured to receive the second image of the stereoscopic image pair; and
 processing hardware configured to implement operations comprising:
  in a first depth extraction phase, determining a set of support points in 3D space for at least the first image of the stereoscopic image pair;
  using the set of support points to determine a 3D surface prior; and
  in a second depth extraction phase, computing, for the first image, a second-stage disparity map, by optimizing a second cost function defined so as to penalize deviation in the second-stage disparity map from the 3D surface prior;
  wherein disparity smoothness is encouraged in the first and/or second depth extraction phases by:
   computing, in the first depth extraction phase, a first-stage disparity map for the first image, by optimizing a first cost function defined so as to: (i) encourage matching between pixels of the first image and pixels of the second image associated therewith by the first-stage disparity map, whilst (ii) penalizing deviations in disparity between nearby pixels of the first-stage disparity map, the set of support points determined from the first-stage disparity map in that event; and/or
   defining the second cost function in the second depth extraction phase so as to penalize deviations in disparity between nearby pixels of the second-stage disparity map.

2. The image processing system of claim 1, wherein the second cost function encourages assignment of disparities to pixels in the second depth extraction phase such that corresponding 3D locations satisfy a specified geometric relationship with respect to the 3D surface prior.

3. The image processing system of claim 2, wherein the specified geometric relationship is that the corresponding 3D locations are within a predetermined radius of the 3D surface prior.

4. The image processing system of claim 1, wherein the second cost function encourages matching between pixels of the first image and pixels of the second image associated therewith by the second-stage disparity map.

5. The image processing system of claim 1, wherein disparity smoothness is encouraged in the first depth extraction phase and/or the second depth extraction phase.

6. The image processing system of claim 5, wherein disparity smoothness is encouraged in the second depth extraction phase and, in the first depth extraction phase, a first-stage disparity map for at least the first image is computed by optimizing a first cost function which encourages matching between pixels of the first image and pixels of the second image associated therewith by the first-stage disparity map, wherein the first cost function optionally penalizes deviations in disparity between nearby pixels of the first-stage disparity map.

7. The image processing system of claim 5, wherein the set of support points is determined by applying robustness checks to disparities of the first-stage disparity map, the set of support points corresponding to a reduced subset of pixels whose assigned disparities in the first-stage disparity map satisfy the robustness checks.

8. The image processing system of claim 7, wherein, in the first depth extraction phase, an additional first-stage disparity map is computed for the second image, wherein the robustness checks comprise at least one left-right (L-R) consistency check applied to the first-stage disparity map and the additional first-stage disparity map.

9. The image processing system of claim 7, wherein the second-stage disparity map retains disparities assigned to a reduced subset of pixels of the first-stage disparity map, the reduced subset of pixels corresponding the set of support points, wherein new disparity values are only assigned to the remaining pixels of the second-stage disparity map.

10. The image processing system of claim 1, wherein:
 smoothness is encouraged in the first depth extraction phase, and
 an embedded processor of the processing hardware is configured to optimize the first cost function using a reduced set of scan lines, each scan line defining a direction over which disparity deviations are penalized, whereby disparity deviations are not penalized in all possible directions.

11. The image processing system of claim 10, wherein, in the first depth extraction phase, an additional first-stage disparity map is computed for the second image, wherein robustness checks comprise at least one left-right (L-R) consistency check applied to the first-stage disparity map and the additional first-stage disparity map;
 wherein the L-R consistency check is applied to compute a first intermediate depth map for the first image, and the first depth extraction phase further comprises:
  computing two further disparity maps for rotated versions of the first and second images,
  applying a second L-R consistency check to the two further disparity maps, thereby computing a second intermediate depth map for the rotated version of the second image, rotating the second intermediate depth map to counteract the rotation of the images, thereby determining a rotated second intermediate depth map for the second image, and applying a third consistency check to the first intermediate depth map for the first image and the rotated second intermediate depth map for the second image, thereby determining a reduced-bias disparity map for determining the set of support points.

12. The image processing system of claim 11, wherein the set of support points is determined by applying support checking to the reduced-bias disparity map, to filter-out points determined to be inconsistent with neighbouring points.

13. The image processing system of claim 1, wherein pixels of the second-stage disparity map corresponding to the set of support points have fixed disparities in the second-stage depth map, which are not varied as the second cost function is optimized.

14. The image processing system of claim 1, wherein, in the first depth-extraction phase, the set of support points is at least partially determined from another modality of sensor data captured substantially simultaneously with the stereoscopic image pair.

15. A method of extracting depth information from a stereoscopic pair of images, the method implemented in an image processing system and comprising:

in a first depth extraction phase, computing at least one disparity map which assigns disparities to a set of pixels of a stereoscopic image pair;

applying robustness checks to the at least one disparity map in order to determine a set of support points in 3D space corresponding to a reduced subset of the pixels whose assigned disparities satisfy the robustness checks;

using the set of support points to determine a 3D surface; and in a second depth extraction phase, computing a further disparity map for the stereoscopic image pair, wherein the further disparity map retains the disparities assigned to the subset of pixels in the first depth extraction phase, wherein new disparity values are only assigned to the remaining pixels in the second depth extraction phase.

16. The method of claim 15, wherein the further disparity map is calculated by optimizing a cost function defined so as to penalize deviation in the further disparity map from the 3D surface.

17. A method of extracting depth information from a stereoscopic pair of images, formed of a first image and a second image, the method implemented in an image processing system and comprising:

in a first depth extraction phase, computing at least one first-stage disparity map which assigns disparities to a set of pixels of a stereoscopic image pair;

applying robustness checks to the at least one first-stage disparity map in order to determine a reduced subset of the pixels whose assigned disparities satisfy the robustness checks; and in a second depth extraction phase, computing a second-stage disparity map in which at least some pixels of the stereoscopic image pair are each assigned disparities from a set of available disparities, the set of available disparities being determined based on the first depth extraction phase disparities which satisfied the robustness checks;

wherein disparity smoothness is encouraged in the first and/or second depth extraction phases by:

computing the first-stage disparity map in the first depth extraction phase by optimizing a first cost function defined so as to: (i) encourage matching between pixels of the first image and pixels of the second image associated therewith by the first-stage disparity map, whilst (ii) penalizing deviations in disparity between nearby pixels of the first-stage disparity map; and/or computing the second-stage disparity map in the second depth extraction phase by optimizing a second cost function defined so as to penalize deviations in disparity between nearby pixels of the second-stage disparity map.

18. The method of claim 17, wherein, in the first depth extraction phase, an additional first-stage disparity map is computed for the second image, wherein the robustness checks comprise at least one left-right (L-R) consistency check applied to the first-stage disparity map and the additional first-stage disparity map.

19. The method of claim 17, wherein the robustness checks comprise support checking, to filter-out pixels determined to be inconsistent with neighbouring pixels.

* * * * *